US012764322B2

(12) United States Patent
Deng et al.

(10) Patent No.: US 12,764,322 B2
(45) Date of Patent: Oct. 13, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Zhipin Deng, Beijing (CN); Kai Zhang, Los Angeles, CA (US); Li Zhang, Los Angeles, CA (US); Yuwen He, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 8 days.

(21) Appl. No.: 18/671,747

(22) Filed: May 22, 2024

(65) Prior Publication Data

US 2024/0314346 A1 Sep. 19, 2024

Related U.S. Application Data

(63) Continuation of application No. PCT/CN2022/133347, filed on Nov. 21, 2022.

(30) Foreign Application Priority Data

Nov. 22, 2021 (WO) ................ PCT/CN2021/132203

(51) Int. Cl.
*H04N 19/513* (2014.01)
*H04N 19/176* (2014.01)

(52) U.S. Cl.
CPC ......... *H04N 19/513* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 2020/0007885 | A1* | 1/2020 | Kondo | H04N 19/51 |
| 2020/0314445 | A1 | 10/2020 | Park et al. | |
| 2020/0374544 | A1 | 11/2020 | Liu et al. | |
| 2021/0092427 | A1* | 3/2021 | Chen | H04N 19/513 |
| 2021/0314596 | A1 | 10/2021 | Wang et al. | |

OTHER PUBLICATIONS

International Search Report in PCT/CN2022/133347, mailed Feb. 15, 2023, 4 pages.

* cited by examiner

*Primary Examiner* — Christopher G Findley
(74) *Attorney, Agent, or Firm* — Astute IP Law Group

(57) ABSTRACT

Embodiments of the present disclosure provide a solution for video processing. A method for video processing is proposed. The method comprises: refining, during a conversion between a target block of a video and a bitstream of the target block, a bi-motion vector predictor (MVP) of the target block by applying a decoder side motion vector derivation process, and wherein the target block is coded with an advanced motion vector prediction (AMVP) mode; and performing the conversion based on the refined bi-MVP.

19 Claims, 23 Drawing Sheets

| Merge Index | L0 MV | L1 MV |
|---|---|---|
| 0 | x | |
| 1 | | x |
| 2 | x | |
| 3 | | x |
| 4 | x | |

METHOD, APPARATUS, AND MEDIUM FOR VIDEO PROCESSING

CROSS-REFERENCE OF RELATED APPLICATION(S)

The application is a continuation of International Patent Application No. PCT/CN2022/133347, filed on Nov. 21, 2022, which claims the benefit of International Patent Application No. PCT/CN2021/132203, filed on Nov. 22, 2021, entitled "METHOD, APPARATUS, AND MEDIUM FOR VIDEO PROCESSING", which is hereby incorporated by reference in its entirety.

FIELD

Embodiments of the present disclosure relates generally to video coding techniques, and more particularly, to a decoder side motion vector refinement (DMVR) for AMVP, adaptive DMVR in image/video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of video coding techniques is generally expected to be further improved.

SUMMARY

Embodiments of the present disclosure provide a solution for video processing.

In a first aspect, a method for video processing is proposed. The method comprises: refining, during a conversion between a target block of a video and a bitstream of the target block, a bi-motion vector predictor (MVP) of the target block by applying a decoder side motion vector derivation process, and wherein the target block is coded with an advanced motion vector prediction (AMVP) mode; and performing the conversion based on the refined bi-MVP. Compared with conventional technologies, a higher coding gain can be achieved. Furthermore, coding efficiency can be improved.

In a second aspect, another method for video processing is proposed. The method comprises: applying, during a conversion between a target block of a video and a bitstream of the target block, a decoder side motion vector refinement (DMVR) process to the target block, wherein the DMVR process comprises one or more stages of motion vector refinements; and performing the conversion based on the DMVR process. Compared with conventional technologies, a higher coding gain can be achieved. Furthermore, coding efficiency can be improved.

In a third aspect, another method for video processing is proposed. The method comprises: determining, during a conversion between a target block of a video and a bitstream of the target block, at least one of the followings for the target block: whether to use a refined motion vector (MV) provided by a decoder side motion vector refinement (DMVR) or whether to update a L0 and/or L1 motion vector after the DMVR process, based on a result of the DMVR process; and performing the conversion based on the determining. Compared with conventional technologies, a higher coding gain can be achieved. Furthermore, coding efficiency can be improved.

In a fourth aspect, another method for video processing is proposed. The method comprises: determining, during a conversion between a target block of a video and a bitstream of the target block, a reference index pair for a symmetric motion vector difference (SMVD) for the target block at block level; and performing the conversion based on the reference index pair. Compared with conventional technologies, a higher coding gain can be achieved. Furthermore, coding efficiency can be improved.

In a fifth aspect, an apparatus for processing video data is proposed. The apparatus for processing video data comprising a processor and a non-transitory memory with instructions thereon, wherein the instructions upon execution by the processor, cause the processor to perform a method in accordance with any of the first, second, third, or fourth aspect.

In a sixth aspect, a non-transitory computer-readable storage medium is proposed. The non-transitory computer-readable storage medium stores instructions that cause a processor to perform a method in accordance with any of the first, second, third, or fourth aspect.

In a seventh aspect, a non-transitory computer-readable recording medium is proposed. The non-transitory computer-readable recording medium stores a bitstream of a video which is generated by a method performed by a video processing apparatus. The method comprises: refining a bi-motion vector predictor (MVP) of a target block of the video by applying a decoder side motion vector derivation process, and wherein the target block is coded with an advanced motion vector prediction (AMVP) mode; and generating a bitstream of the target block based on the refined bi-MVP.

In an eighth aspect, a method for storing bitstream of a video, comprises: refining a bi-motion vector predictor (MVP) of a target block of the video by applying a decoder side motion vector derivation process, and wherein the target block is coded with an advanced motion vector prediction (AMVP) mode; generating a bitstream of the target block based on the refined bi-MVP; and storing the bitstream in a non-transitory computer-readable recording medium.

In a ninth aspect, another non-transitory computer-readable recording medium is proposed. The non-transitory computer-readable recording medium stores a bitstream of a video which is generated by a method performed by a video processing apparatus. The method comprises: applying a decoder side motion vector refinement (DMVR) process to a target block of the video, wherein the DMVR process comprises one or more stages of motion vector refinements; and generating a bitstream of the target block based on the DMVR process.

In a tenth aspect, a method for storing bitstream of a video, comprising: applying a decoder side motion vector refinement (DMVR) process to a target block of the video, wherein the DMVR process comprises one or more stages of motion vector refinements; generating a bitstream of the target block based on the DMVR process; and storing the bitstream in a non-transitory computer-readable recording medium.

In an eleventh aspect, another non-transitory computer-readable recording medium is proposed. The non-transitory computer-readable recording medium stores a bitstream of a video which is generated by a method performed by a video processing apparatus. The method comprises: determining at least one of the followings for a target block of the video:

whether to use a refined motion vector (MV) provided by a decoder side motion vector refinement (DMVR) or whether to update a L0 and/or L1 motion vector after the DMVR process, based on a result of the DMVR process; and generating a bitstream of the target block based on the determining.

In a twelfth aspect, a method for storing bitstream of a video, comprises: determining at least one of the followings for a target block of the video: whether to use a refined motion vector (MV) provided by a decoder side motion vector refinement (DMVR) or whether to update a L0 and/or L1 motion vector after the DMVR process, based on a result of the DMVR process; generating a bitstream of the target block based on the determining; and storing the bitstream in a non-transitory computer-readable recording medium.

In a thirteenth aspect, another non-transitory computer-readable recording medium is proposed. The non-transitory computer-readable recording medium stores a bitstream of a video which is generated by a method performed by a video processing apparatus. The method comprises: determining a reference index pair for a symmetric motion vector difference (SMVD) for a target block of the video at block level; and generating a bitstream of the target block based on the reference index pair.

In a fourteenth aspect, a method for storing bitstream of a video, comprises: determining a reference index pair for a symmetric motion vector difference (SMVD) for a target block of the video at block level; generating a bitstream of the target block based on the reference index pair; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 18*a* illustrates spatial neighboring blocks used by SbTMVP and FIG. 18*b* illustrates deriving sub-CU motion field by applying a motion shift from spatial neighbor and scaling the motion information from the corresponding collocated sub-CUs;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms “first” and “second” etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term “and/or” includes any and all combinations of one or more of the listed terms.

The terminology used herein is for the purpose of describing particular embodiments only and is not intended to be limiting of example embodiments. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components etc., but do not preclude the presence or addition of one or more other features, elements, components and/or combinations thereof.

Example Environment

Figure 1:
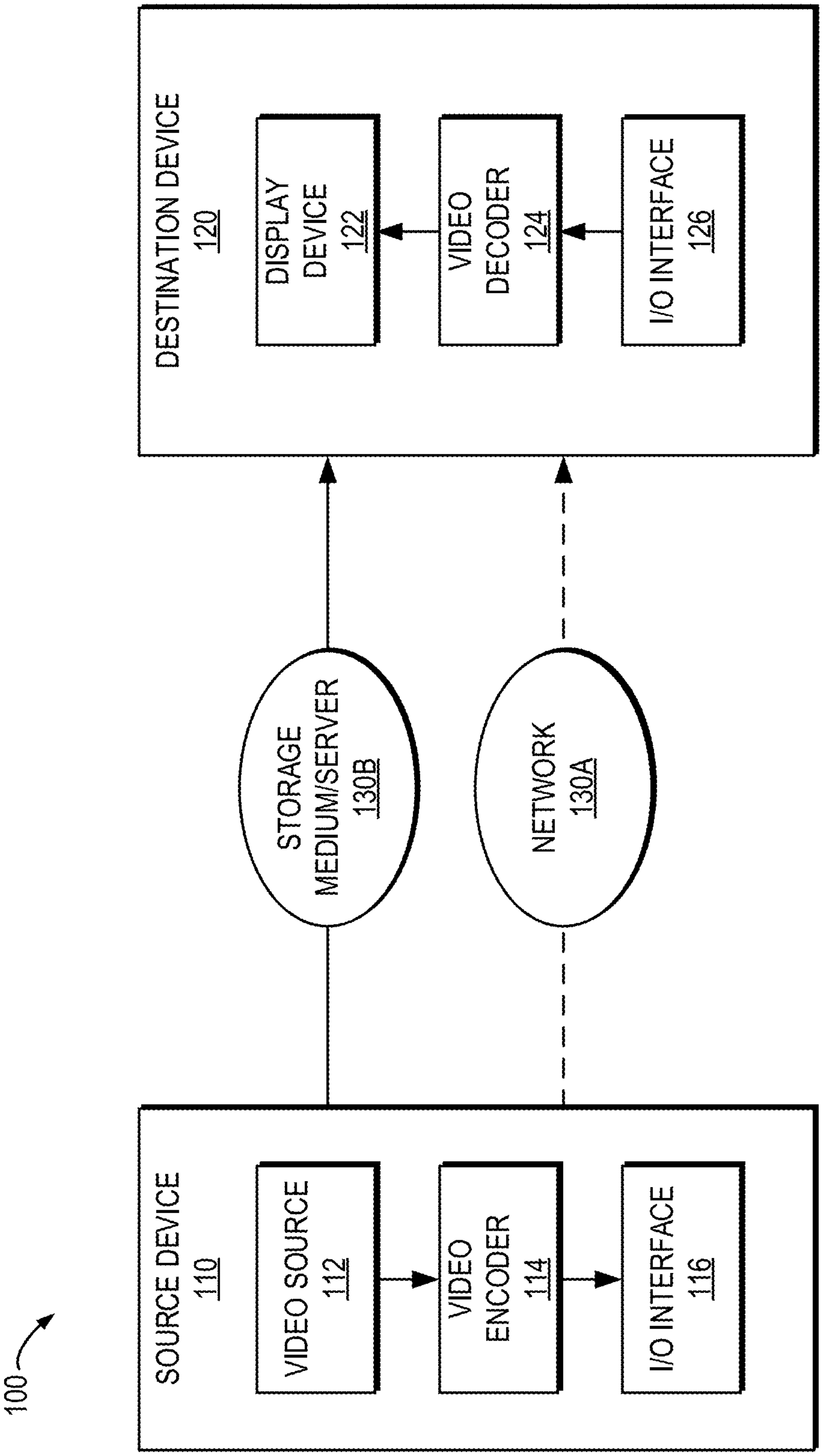
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
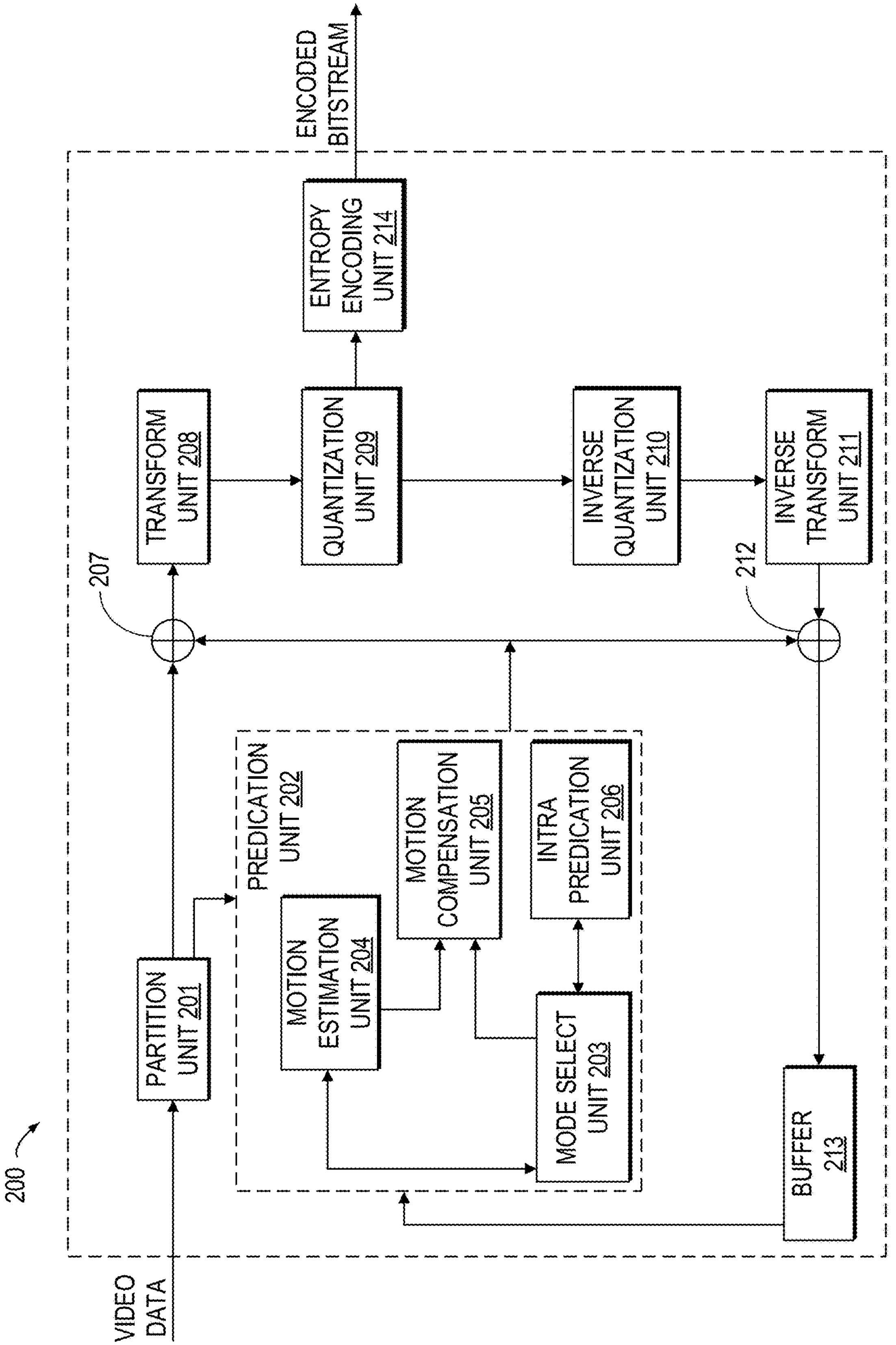
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
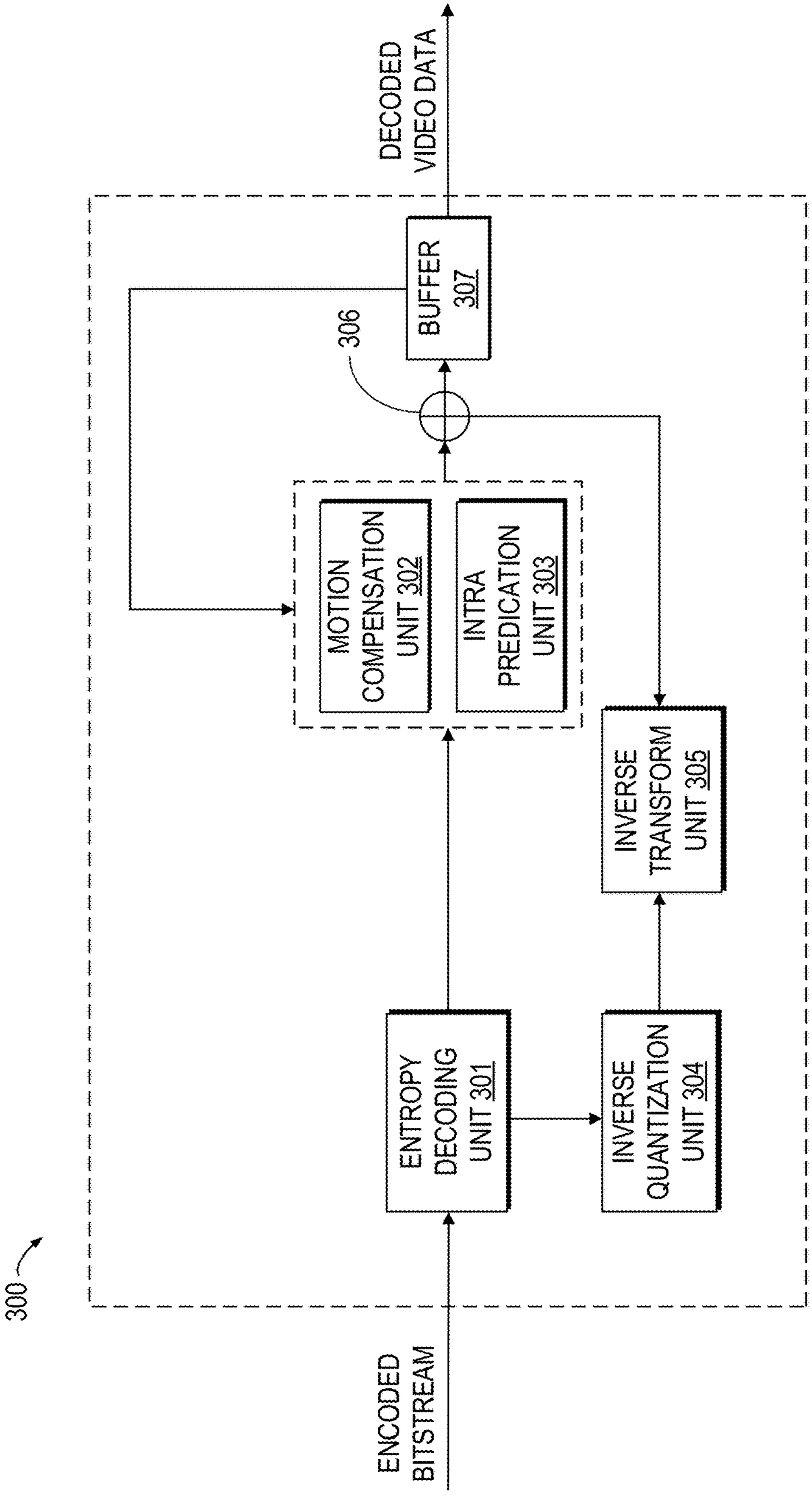
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

The present disclosure is related to video coding technologies. Specifically, it is about DMVR/BDOF based enhancements in image/video coding. It may be applied to the existing video coding standard like HEVC, VVC, and etc. It may be also applicable to future video coding standards or video codec.

2. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

2.1. Existing Inter Prediction Coding Tools

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction;
Merge mode with MVD (MMVD);
Symmetric MVD (SMVD) signalling;
Affine motion compensated prediction;
Subblock-based temporal motion vector prediction (SbTMVP);
Adaptive motion vector resolution (AMVR);
Motion field storage: $1/16^{th}$ luma sample MV storage and 8×8 motion field compression;
Bi-prediction with CU-level weight (BCW);
Bi-directional optical flow (BDOF);
Decoder side motion vector refinement (DMVR);
Geometric partitioning mode (GPM);
Combined inter and intra prediction (CIIP).

The following text provides the details on those inter prediction methods specified in VVC.

2.1.1. Extended Merge Prediction

In VVC, the merge candidate list is constructed by including the following five types of candidates in order:

1) Spatial MVP from spatial neighbour CUs;
2) Temporal MVP from collocated CUs;
3) History-based MVP from an FIFO table;
4) Pairwise average MVP;
5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.1.1.1. Spatial Candidates Derivation

Figure 4:
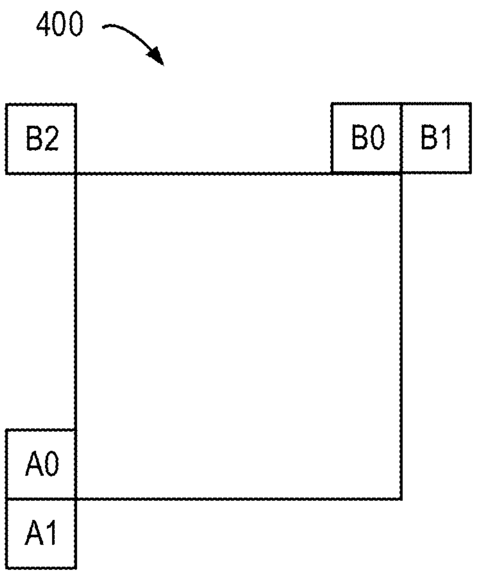
FIG. 4 illustrates positions of spatial merge candidate.
Figure 5:
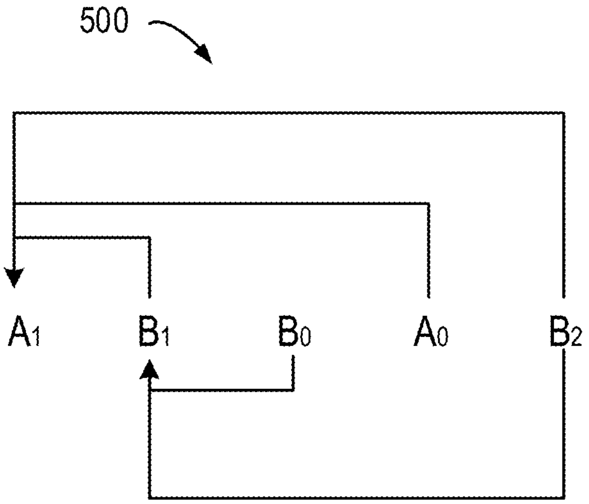
FIG. 5 illustrates candidate pairs considered for redundancy check of spatial merge candidates.

The derivation of spatial merge candidates in VVC is same to that in HEVC except the positions of first two merge candidates are swapped. FIG. 4 is a schematic diagram 400 illustrating positions of a spatial merge candidate. A maximum of four merge candidates are selected among candidates located in the positions depicted in FIG. 4. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 5 is a schematic diagram 500 illustrating candidate pairs considered for redundancy check of spatial merge candidates. Instead only the pairs linked with an arrow in FIG. 5 are considered and a candidate is only added to the list if the corresponding candidate used for redundancy check has not the same motion information.

2.1.1.2. Temporal Candidates Derivation

Figure 6:
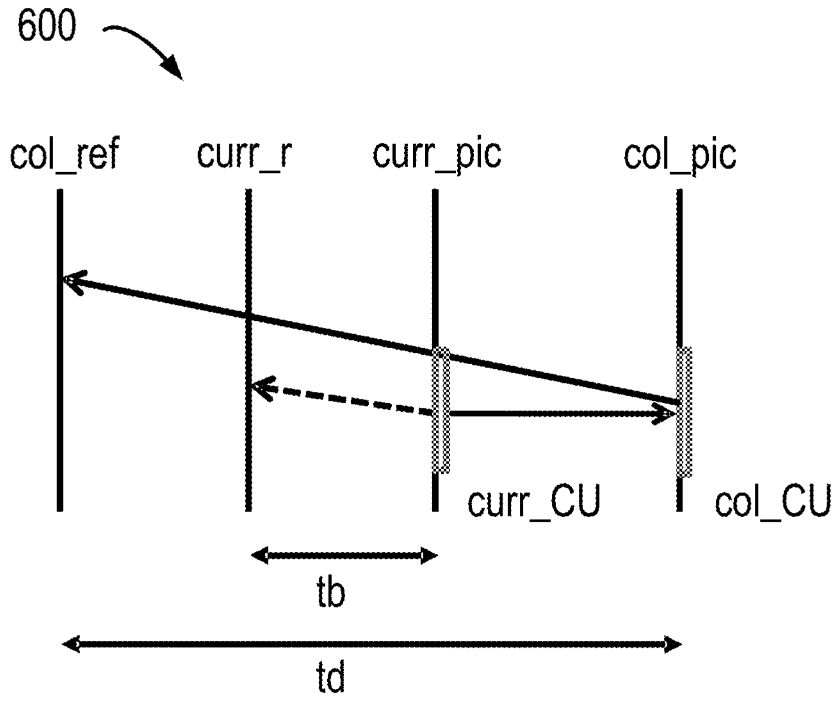
FIG. 6 is an illustration of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in the diagram 600 of FIG. 6, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference pic-ture index of temporal merge candidate is set equal to zero.

Figure 7:
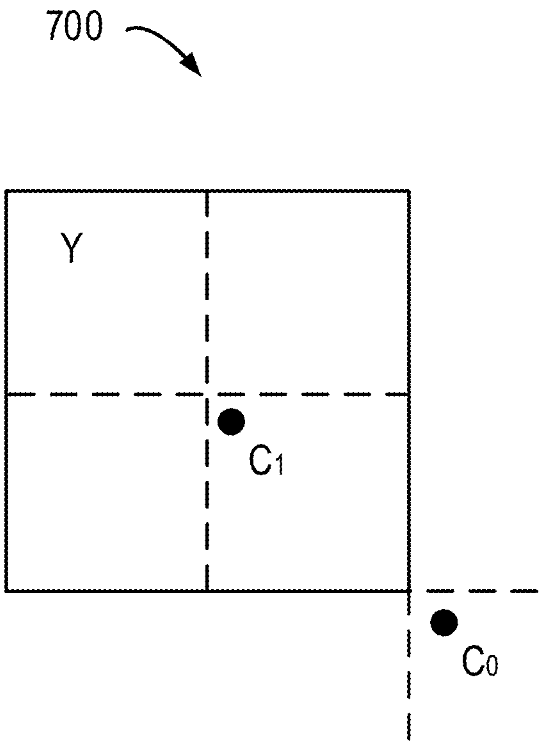
FIG. 7 shows candidate positions for temporal merge candidate, $C_0$ and $C_1$.

FIG. 7 is a schematic diagram 700 illustrating candidate positions for temporal merge candi-date, C0 and C1. The position for the temporal candidate is selected between candidates C0 and C1, as depicted in FIG. 7. If CU at position C0 is not available, is intra coded, or is out-side of the current row of CTUs, position C1 is used. Otherwise, position C0 is used in the derivation of the temporal merge candidate.

2.1.1.3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4) ? M: (8–N), wherein N indicates number of existing candidates in the merge list and M indicates number of available HMVP candidates in the table.
2. Once the total number of available merge candidates reaches the maximally allowed merge candidates minus 1, the merge candidate list construction process from HMVP is terminated.

2.1.1.4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. When the merge list is not full after pair-wise average merge candidates are added, the zero MVPs are inserted in the end until the maximum merge candidate number is encountered.

2.1.1.5. Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

2.1.2. Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Figure 8:
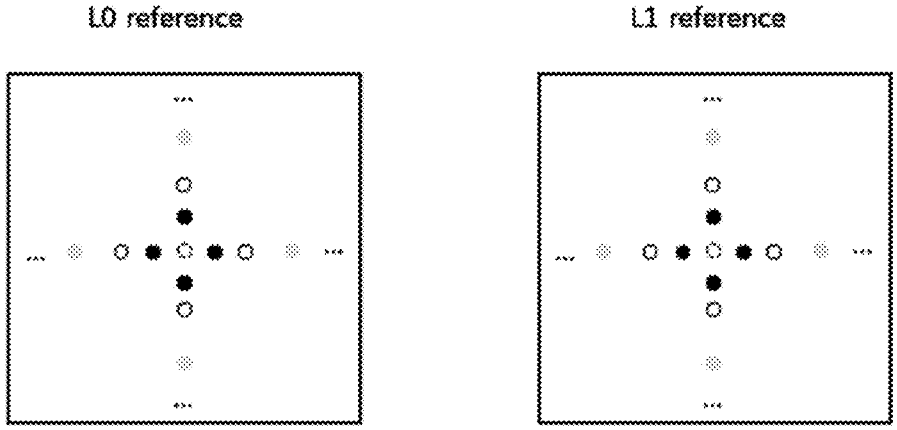
FIG. 8 shows MMVD search point.

Distance index specifies motion magnitude information and indicate the pre-defined offset from the starting point. As shown in FIG. 8, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 2. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign Table 1 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.1.2.1. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals:

$$P_{bi\text{-}pred} = ((8-w)*P_0 + w*P_1 + 4) \gg 3. \tag{2-1}$$

Five weights are allowed in the weighted averaging bi-prediction, w ε {-2, 3, 4, 5, 10}. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w ∈ {3,4,5}) are used.

- At the encoder, fast search algorithms are applied to find the weight index without significantly increasing the encoder complexity. These algorithms are summarized as follows. When combined with AMVR, unequal weights are only conditionally checked for 1-pel and 4-pel motion vector precisions if the current picture is a low-delay picture.
- When combined with affine, affine ME will be performed for unequal weights if and only if the affine mode is selected as the current best mode.
- When the two reference pictures in bi-prediction are the same, unequal weights are only conditionally checked.
- Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

2.1.2.2. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

- The CU is coded using "true" bi-prediction mode, i.e., one of the two reference pictures is prior to the current picture in display order and the other is after the current picture in display order;
- The distances (i.e. POC difference) from two reference pictures to the current picture are same;
- Both reference pictures are short-term reference pictures;
- The CU is not coded using affine mode or the ATMVP merge mode;
- CU has more than 64 luma samples;

- Both CU height and CU width are larger than or equal to 8 luma samples;
- BCW weight index indicates equal weight;
- WP is not enabled for the current CU;
- CIIP mode is not used for the current CU.

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients $$\frac{\partial I^{(k)}}{\partial x}(i,j) \text{ and } \frac{\partial I^{(k)}}{\partial y}(i,j),$$

k=0,1, of the two prediction signals are computed by directly calculating the difference between two neighboring samples, i.e., $$\frac{\partial I^{(k)}}{\partial x}(i,j) = \left(\left(I^{(k)}(i+1,j) \gg shift1\right) - \left(I^{(k)}(i-1,j) \gg shift1\right)\right) \tag{2-2}$$
$$\frac{\partial I^{(k)}}{\partial y}(i,j) = \left(\left(I^{(k)}(i,j+1) \gg shift1\right) - \left(I^{(k)}(i,j-1) \gg shift1\right)\right)$$

where $I^{(k)}(i,j)$ are the sample value at coordinate (i,j) of the prediction signal in list k, k=0,1, and shift1 is calculated based on the luma bit depth, bitDepth, as shift1=max(6, bitDepth-6). Then, the auto- and cross-correlation of the gradients, $S_1$, $S_2$, $S_3$, $S_5$ and $S_6$, are calculated as $$S_1 = \sum_{(i,j)\in\Omega} \text{Abs}(\psi_x(i,j)),\ S_3 = \sum_{(i,j)\in\Omega} \theta(i,j)\cdot\text{Sign}(\psi_x(i,j)) \tag{2-3}$$
$$S_2 = \sum_{(i,j)\in\Omega} \psi_x(i,j)\cdot\text{Sign}(\psi_y(i,j))$$
$$S_5 = \sum_{(i,j)\in\Omega} \text{Abs}(\psi_y(i,j)),\ S_6 = \sum_{(i,j)\in\Omega} \theta(i,j)\cdot\text{Sign}(\psi_y(i,j))$$

where $$\psi_x(i,j) = \left(\frac{\partial I^{(1)}}{\partial x}(i,j) + \frac{\partial I^{(0)}}{\partial x}(i,j)\right) \gg n_a \tag{2-4}$$
$$\psi_y(i,j) = \left(\frac{\partial I^{(1)}}{\partial y}(i,j) + \frac{\partial I^{(0)}}{\partial y}(i,j)\right) \gg n_a$$
$$\theta(i,j) = \left(I^{(1)}(i,j) \gg n_b\right) - \left(I^{(0)}(i,j) \gg n_b\right)$$

where Ω is a 6×6 window around the 4×4 subblock, and the values of $n_a$ and $n_b$ are set equal to min(1, bitDepth−11) and min(4, bitDepth−8), respectively.

The motion refinement $(v_x, v_y)$ is then derived using the cross- and auto-correlation terms using the following:

$$v_x = S_1 > 0?\ clip3\ \left(-th'_{BIO}, th'_{BIO}, -\left(\left(S_3\cdot 2^{n_b-n_a}\right) \gg \lfloor \log_2 S_1 \rfloor\right)\right):0 \tag{2-5}$$
$$v_y = S_5 > 0?\ clip3$$
$$\left(-th'_{BIO}, th'_{BIO}, -\left(\left(S_6\cdot 2^{n_b-n_a} - \left(\left(v_x S_{2,m}\right) \ll n_{S_2} + v_x S_{2,s}\right)/2\right) \gg \lfloor \log_2 S_5 \rfloor\right)\right):0$$

where $S_{2,m}=S_2>>n_{S_2}$, $S_{2,s}=S_2\&(2^{nS_2}-1)$, $th'_{BIO}=2^{max(5,BD-7)}$. $\lfloor\cdot\rfloor$ is the floor function, and $n_{S_2}=12$.

Based on the motion refinement and the gradients, the following adjustment is calculated for each sample in the 4×4 subblock:

$$b(x, y) = rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right). \quad (2\text{-}6)$$

Finally, the BDOF samples of the CU are calculated by adjusting the bi-prediction samples as follows:

$$pred_{BDOF}(x, y) = \left(I^{(0)}(x, y) + I^{(1)}(x, y) + b(x, y) + o_{offset}\right) \gg \text{shift}. \quad (2\text{-}7)$$

Figure 9:
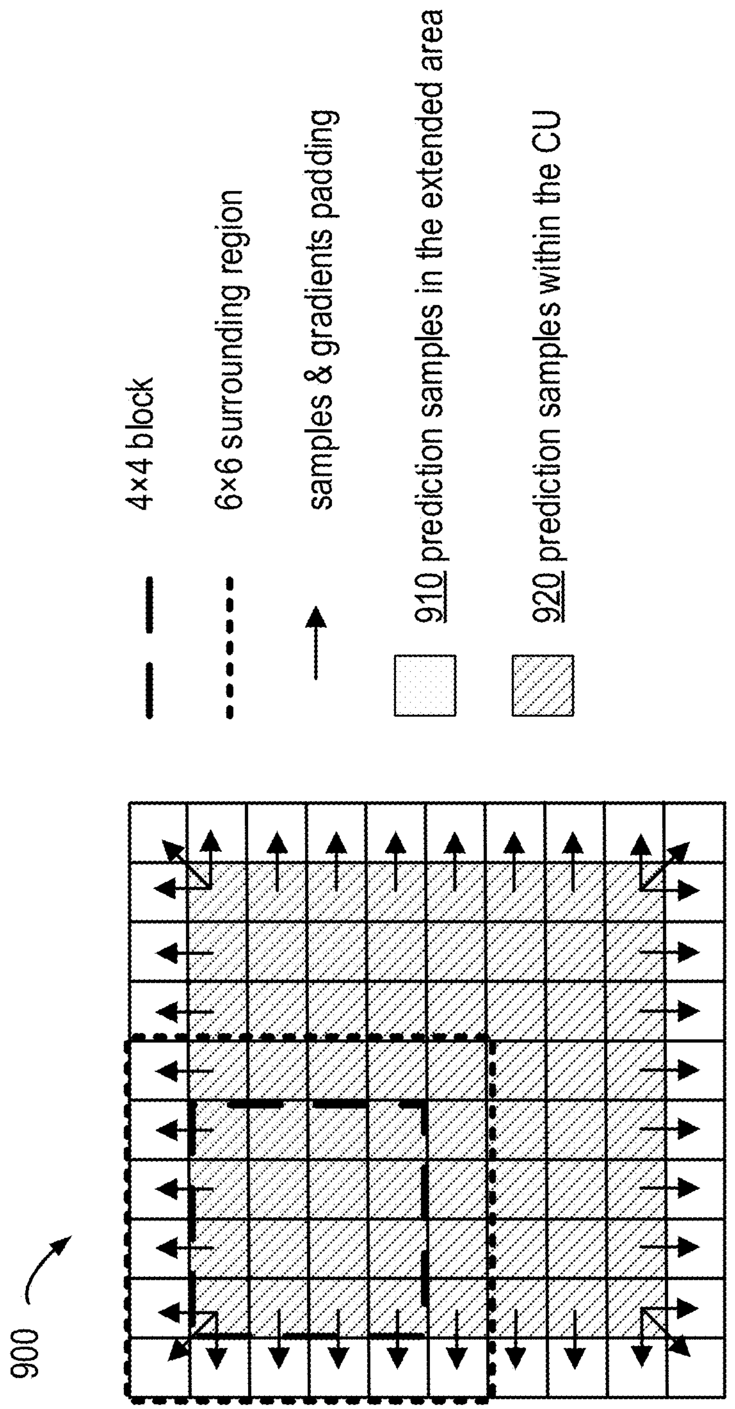
FIG. 9 shows extended CU region used in BDOF.

These values are selected such that the multipliers in the BDOF process do not exceed 15-bit, and the maximum bit-width of the intermediate parameters in the BDOF process is kept within 32-bit. In order to derive the gradient values, some prediction samples $I^{(k)}(i,j)$ in list k (k=0,1) outside of the current CU boundaries need to be generated. FIG. 9 illustrates a schematic diagram of extended CU region used in BDOF. As depicted in the diagram 900 of FIG. 9, the BDOF in VVC uses one extended row/column around the CU's boundaries. In order to control the computational complexity of generating the out-of-boundary prediction samples, prediction samples in the extended area (denoted as 910 in FIG. 9) are generated by taking the reference samples at the nearby integer positions (using floor( ) operation on the coordinates) directly without interpolation, and the normal 8-tap motion compensation interpolation filter is used to generate prediction samples within the CU (denoted as 920 in FIG. 9). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CIIP mode, BDOF is also disabled.

2.1.2.3. Symmetric MVD Coding (SMVD)

In VVC, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1) At slice level, variables BiDirPredFlag, RefIdxSymL0 and RefIdxSymL1 are derived as follows:
   If mvd_l1_zero_flag is 1, BiDirPredFlag is set equal to 0.
   Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.
2) At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula:

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}. \quad (2\text{-}8)$$

Figure 10:
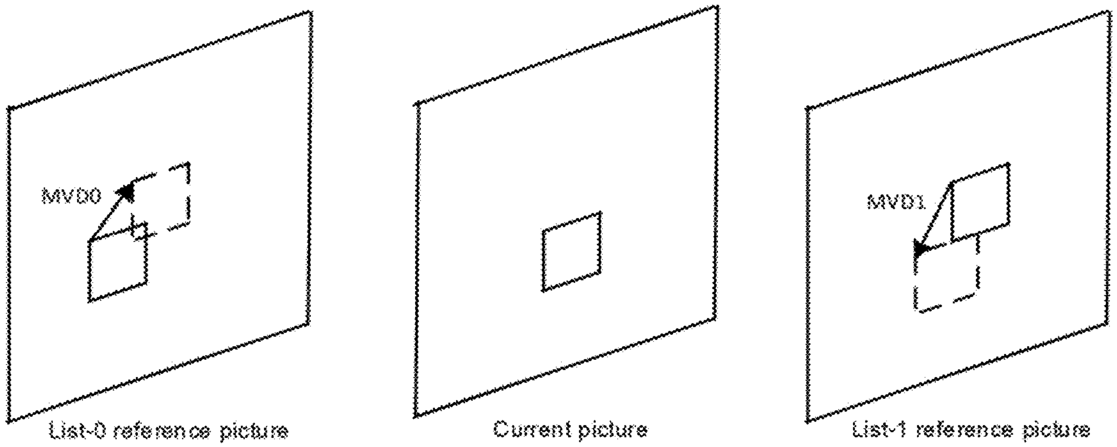
FIG. 10 is an illustration for symmetrical MVD mode.

FIG. 10 is an illustration for symmetrical MVD mode. In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

2.1.3. Affine Motion Compensated Prediction

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIG. 11, the affine motion field of the block is described by motion information of two control point (4-parameter) or three control point motion vectors (6-parameter).

Figure 11:
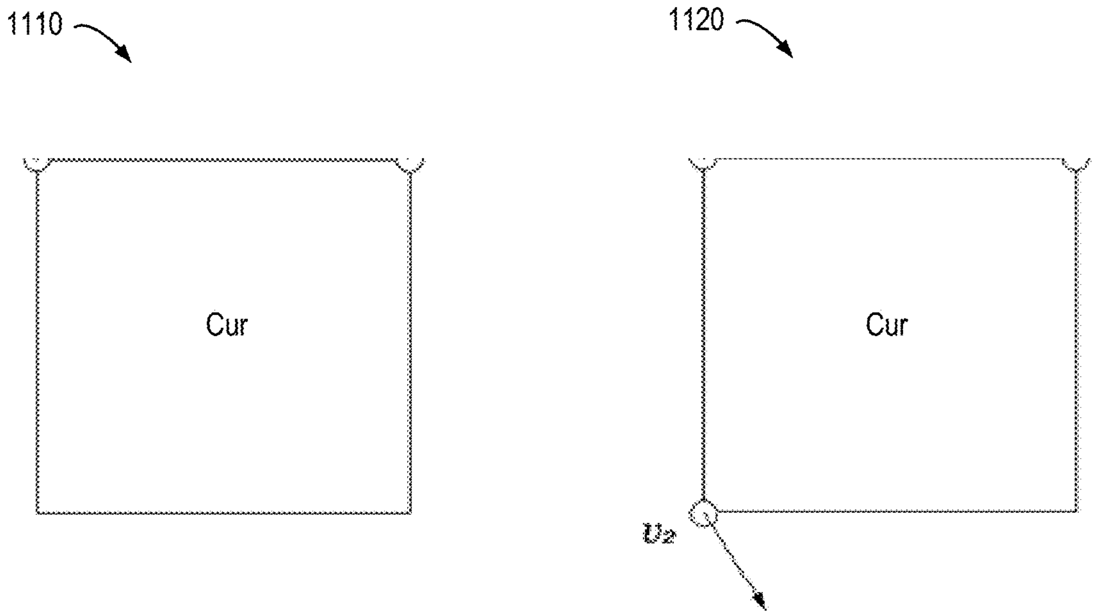
FIG. 11 shows a control point based affine motion model.

For 4-parameter affine motion model 1110 in FIG. 11, motion vector at sample location (x, y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases}. \quad (2\text{-}1)$$

For 6-parameter affine motion model 1120 in FIG. 11, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} . \quad (2\text{-}2)$$

where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 12:
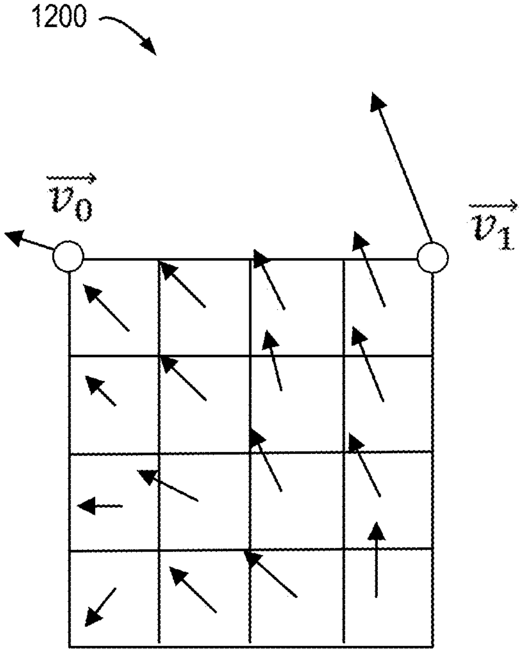
FIG. 12 shows an affine MVF per subblock.

In order to simplify the motion compensation prediction, block based affine transform prediction is applied. FIG. 12 illustrates a schematic diagram 1200 of affine MVF per subblock. To derive motion vector of each 4×4 luma subblock, the motion vector of the center sample of each subblock, as shown in FIG. 12, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the four corresponding 4×4 luma subblocks.

As done for translational motion inter prediction, there are also two affine motion inter prediction modes: affine merge mode and affine AMVP mode.

2.1.3.1. Affine Merge Prediction

AF_MERGE mode can be applied for CUs with both width and height larger than or equal to 8. In this mode the CPMVs of the current CU is generated based on the motion information of the spatial neighbouring CUs. There can be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs;

Constructed affine merge candidates CPMVPs that are derived using the translational MVs of the neighbour CUs;

Zero MVs.

Figure 13:
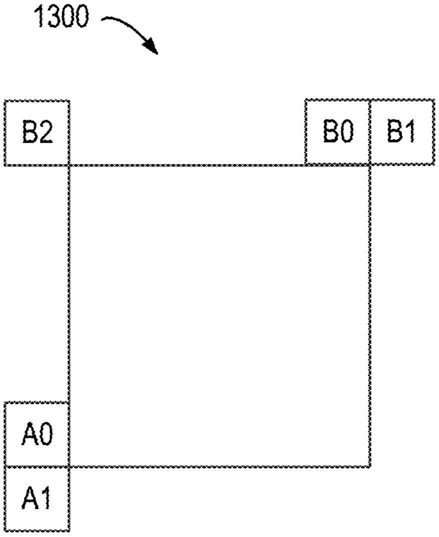
FIG. 13 illustrates locations of inherited affine motion predictors.
Figure 14:
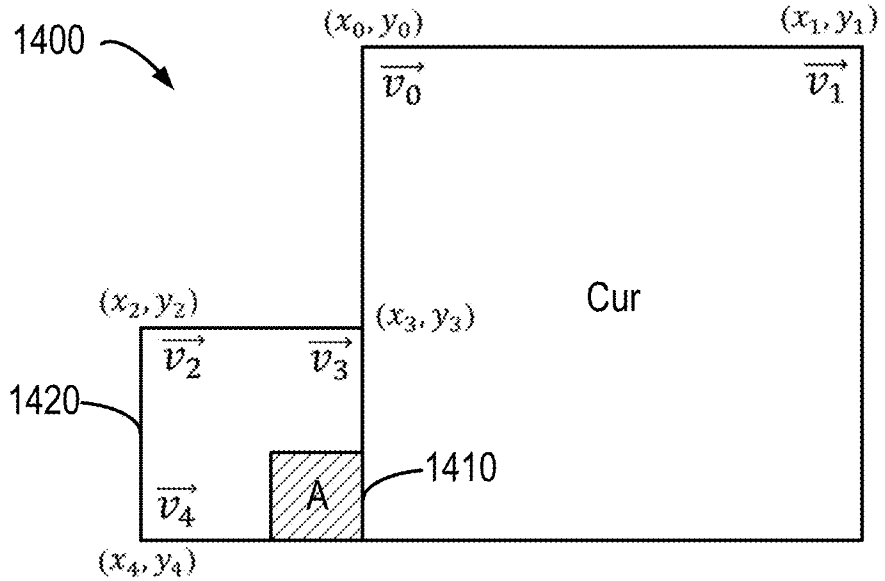
FIG. 14 shows control point motion vector inheritance.

In VVC, there are maximum two inherited affine candidates, which are derived from affine motion model of the neighbouring blocks, one from left neighbouring CUs and one from above neighbouring CUs. FIG. 13 illustrates a schematic diagram 1300 of locations of inherited affine motion predictors. The candidate blocks are shown in FIG. 13. For the left predictor, the scan order is A0→A1, and for the above predictor, the scan order is B0→B1→B2. Only the first inherited candidate from each side is selected. No pruning check is performed between two inherited candidates. When a neighbouring affine CU is identified, its control point motion vectors are used to derive the CPMVP candidate in the affine merge list of the current CU. FIG. 14 illustrates a schematic diagram 1400 of control point motion vector inheritance. As shown in FIG. 14, if the neighbour left bottom block A 1410 is coded in affine mode, the motion vectors $v_2$, $v_3$ and $v_4$ of the top left corner, above right corner and left bottom corner of the CU 1420 which contains the block A 1410 are attained. When block A 1410 is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbour translational motion information of each control point. The motion information for the control points is derived from the specified spatial neighbours and temporal neighbour shown in FIG. 15 which illustrates a schematic diagram 1500 of locations of candidates position for constructed affine merge mode. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP is used as $CPMV_4$ if it's available.

After MVs of four control points are attained, affine merge candidates are constructed based on that motion information. The following combinations of control point MVs are used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}.

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.1.3.2. Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs;

Constructed affine AMVP candidates CPMVPs that are derived using the translational MVs of the neighbour CUs;

Translational MVs from neighboring CUs;

Zero MVs.

The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Figure 15:
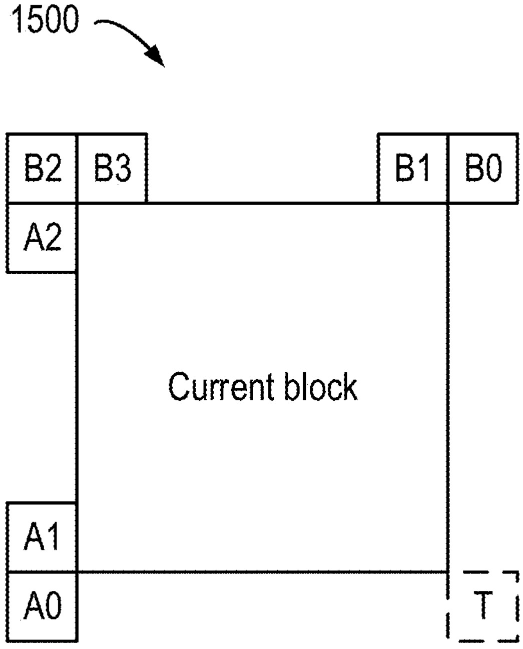
FIG. 15 shows locations of candidates position for constructed affine merge mode.

Constructed AMVP candidate is derived from the specified spatial neighbors shown in FIG. 15. The same checking order is used as done in affine merge candidate construction. In addition, reference picture index of the neighboring block is also checked. The first block in the checking order that is inter coded and has the same reference picture as in current CUs is used. There is only one When the current CU is coded with 4-parameter affine mode, and $mv_0$ and $my_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

2.1.3.3. Affine Motion Information Storage

In VVC, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion com-pensation, MV derivation of merge/AMVP list of translational MVs and de-blocking.

Figure 16:
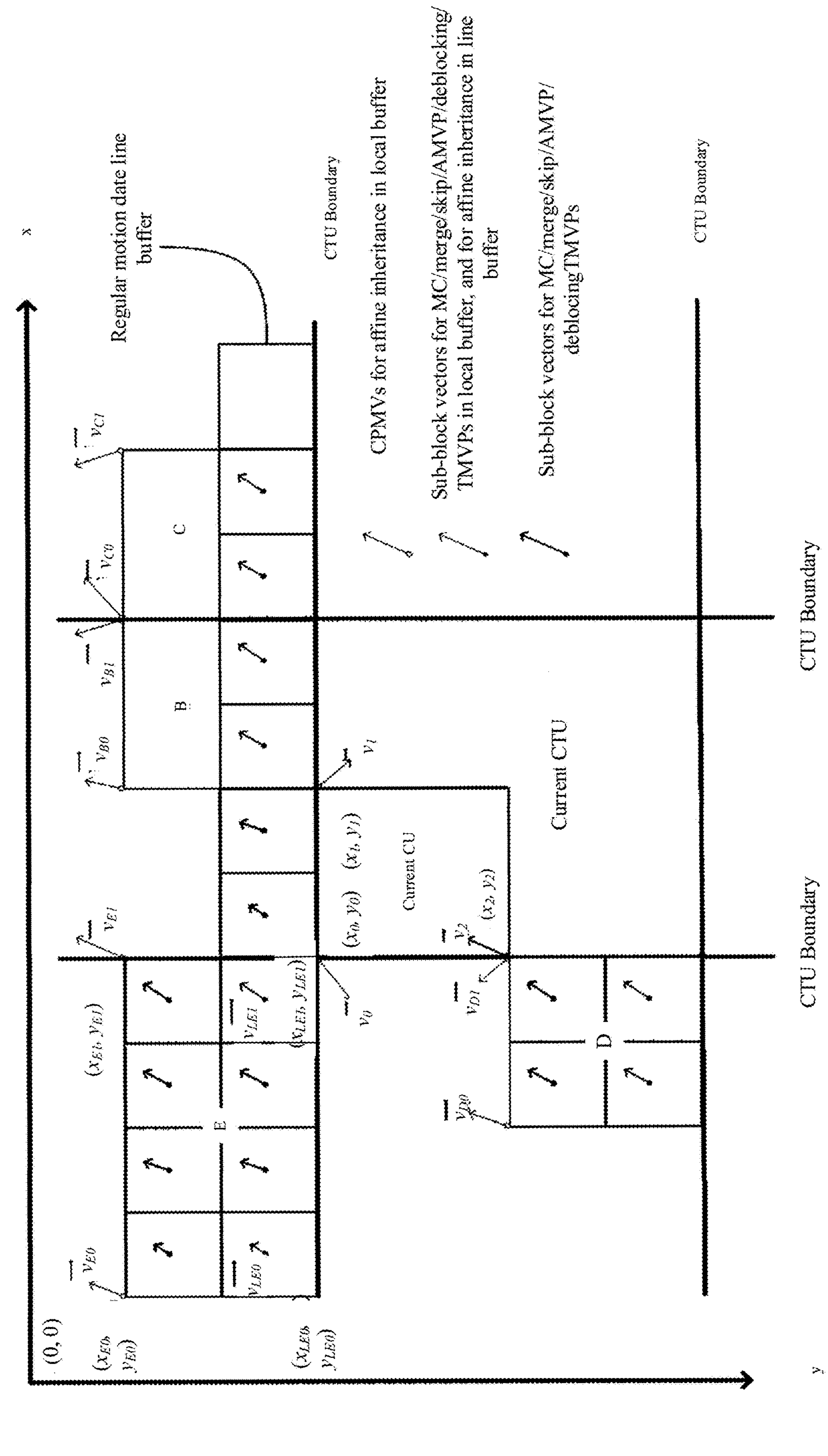
FIG. 16 is an illustration of motion vector usage for proposed combined method.

To avoid the picture line buffer for the additional CPMVs, affine motion data inheritance from the CUs from above CTU is treated differently to the inheritance from the normal neighbouring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in local buffer. If the candidate CU is 6-parameter affine coded, the affine model is degraded to 4-parameter model. As shown in FIG. 16, along the top CTU boundary, the bottom-left and bottom right subblock motion vectors of a CU are used for affine inheritance of the CUs in bottom CTUs.

2.1.3.4. Prediction Refinement with Optical Flow for Affine Mode (PROF)

Subblock based affine motion compensation can save memory access bandwidth and reduce computation complexity compared to pixel based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps: Step 1) The subblock-based affine motion compensation is performed to generate subblock prediction I(i,j).

Step2) The spatial gradients $g_x(i,j)$ and $g_y(i,j)$ of the subblock prediction are calculated at each sample location using a 3-tap filter [−1, 0, 1]. The gradient calculation is exactly the same as gradient calculation in BDOF.

$$g_x(i, j) = (I(i+1, j) \gg shift1) - (I(i-1, j) \gg shift1) \quad (2\text{-}11)$$

$$g_y(i, j) = (I(i, j+1) \gg shift1) - (I(i, j-1) \gg shift1) \quad (2\text{-}12)$$

shift1 is used to control the gradient's precision. The sub-block (i.e. 4×4) prediction is extended by one sample on each side for the gradient calculation. To avoid additional memory bandwidth and additional interpolation computation, those extended samples on the extended borders are copied from the nearest integer pixel position in the reference picture.

Figure 17:
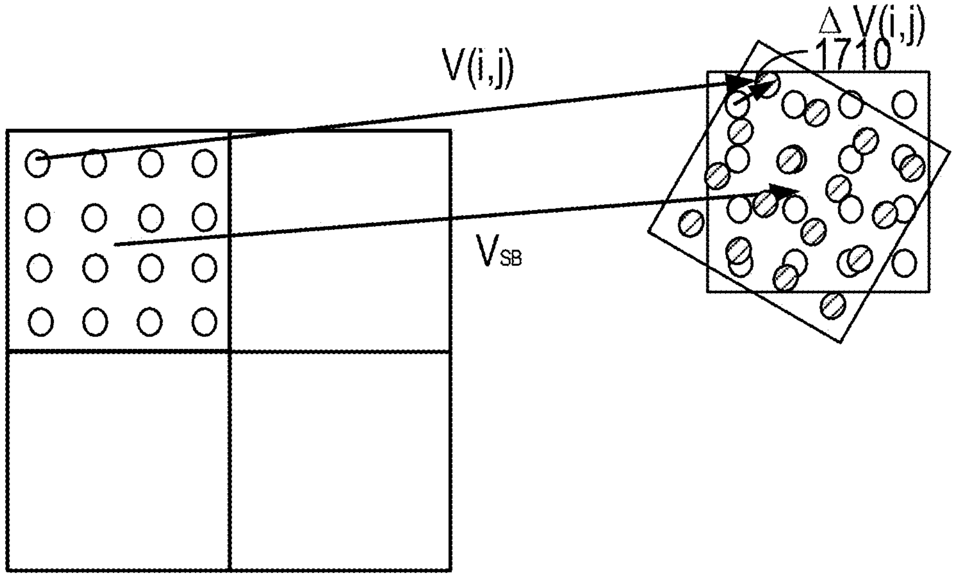
FIG. 17 shows Subblock MV VSB and pixel $\Delta v(i,j)$.

Step 3) The luma prediction refinement is calculated by the following optical flow equation.

$$\Delta I(i, j) = g_x(i, j) * \Delta v_x(i, j) + g_y(i, j) * \Delta v_y(i, j) \quad (2\text{-}13)$$

where the Δv(i,j) is the difference between sample MV computed for sample location (i,j), denoted by v(i,j), and the subblock MV of the subblock to which sample (i,j) belongs, as shown in FIG. 17. The Δv(i,j) (shown as arrow 1710) is quantized in the unit of 1/32 luam sample precision. Since the affine model parameters and the sample location relative to the subblock center are not changed from subblock to subblock, Δv(i,j) can be calculated for the first subblock, and reused for other subblocks in the same CU. Let dx(i,j) and dy(i,j) be the horizontal and vertical offset from the sample location (i,j) to the center of the subblock $(x_{SB}, Y_{SB})$, Δv(x,y) can be derived by the following equation, $$\begin{cases} dx(i, j) = i - x_{SB} \\ dy(i, j) = j - y_{SB} \end{cases} \quad (2\text{-}14)$$

$$\begin{cases} \Delta v_x(i, j) = C * dx(i, j) + D * dy(i, j) \\ \Delta v_y(i, j) = E * dx(i, j) + F * dy(i, j) \end{cases} . \quad (2\text{-}15)$$

In order to keep accuracy, the enter of the subblock $(x_{SB}, Y_{SB})$ is calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \frac{v_{1x} - v_{0x}}{w} \\ E = -D = \frac{v_{1y} - v_{0y}}{w} \end{cases} ; \quad (2\text{-}16)$$

For 6-parameter affine model, $$\begin{cases} C = \frac{v_{1x} - v_{0x}}{w} \\ D = \frac{v_{2x} - v_{0x}}{h} \\ E = \frac{v_{1y} - v_{0y}}{w} \\ F = \frac{v_{2y} - v_{0y}}{h} \end{cases} \quad (2\text{-}17)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement ΔI(i, j) is added to the subblock prediction I(i, j). The final prediction I' is generated as the following equation.

$$I'(i, j) = I(i, j) + \Delta I(i, j)$$

PROF is not be applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

2.1.4. Subblock-Based Temporal Motion Vector Prediction (SbTMVP)

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 18A:
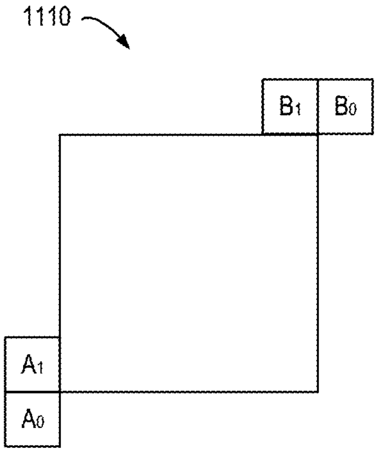
FIGS. 18*a* and 18*b* illustrate the SbTMVP process in VVC, where

The SbTVMP process is illustrated in FIG. 11*a* and FIG. 11*b*. FIG. 11*a* illustrates a schemat-ic diagram 1110 of spatial neighboring blocks used by SbTMVP. SbTMVP predicts the motion vectors of the sub-CUs within the current CU in two steps. In the first step, the spatial neighbor A1 in FIG. 18*a* is examined. If A1 has a motion vector that uses the collocated picture as its reference picture, this motion vector is selected to be the motion shift to be applied. If no such motion is identified, then the motion shift is set to (0, 0).

Figure 18B:
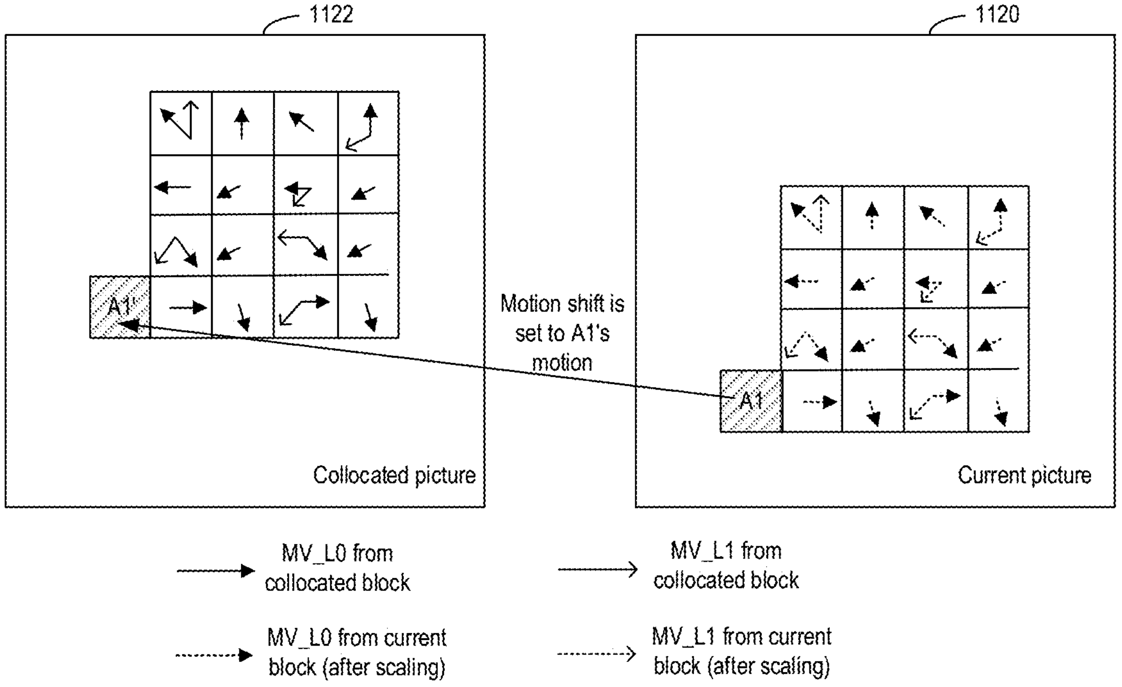

FIG. 18*b* illustrates a schematic diagram of driving sub-CU motion field by applying a mo-tion shift from spatial neighbor and scaling the motion information from the corresponding collocated sub-CUs. In the second step, the motion shift identified in Step 1 is applied (i.e. added to the current block's coordinates) to obtain sub-CU level motion information (motion vectors and reference indices) from the collocated picture as shown in FIG. 18*b*. The example in FIG. 18*b* assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTVMP candidate and affine merge candidates is used for the signalling of subblock based merge mode. The SbTVMP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

2.1.5. Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate half-luma-sample or other MVD precisions (interger or four-luma sample) is used for normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for normal AMVP CU. In the case of affine AMVP CU, the second flag is used to indicate whether integer-luma-sample or 1/16 luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check four times for each MVD resolution, in VTM13, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For affine AMVP mode, if affine inter mode is not selected after checking rate-distortion costs of affine merge/skip mode, merge/skip mode, quarter-luma-sample MVD precision normal AMVP mode and quarter-luma-sample MVD precision affine AMVP mode, then 1/16 luma-sample MV precision and 1-pel MV precision affine inter modes are not checked. Furthermore affine parameters obtained in quarter-luma-sample MV precision affine inter mode is used as starting search point in 1/16 luma-sample and quarter-luma-sample MV precision affine inter modes.

2.1.6. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals:

$$P_{bi\text{-}pred} = ((8-w)*P_0 + w*P_1 + 4) \gg 3. \quad (2\text{-}18)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

- At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.
- When combined with affine, affine ME will be performed for unequal weights if and only if the affine mode is selected as the current best mode.
- When the two reference pictures in bi-prediction are the same, unequal weights are only conditionally checked.
- Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied).For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV. In VVC, CIIP and BCW cannot be jointly applied for a CU. When a CU is coded with CIIP mode, the BCW index of the current CU is set to 2, e.g. equal weight.

2.1.7. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

- The CU is coded using "true" bi-prediction mode, i.e., one of the two reference pictures is prior to the current picture in display order and the other is after the current picture in display order;
- The distances (i.e. POC difference) from two reference pictures to the current picture are same;
- Both reference pictures are short-term reference pictures;
- The CU is not coded using affine mode or the SbTMVP merge mode;
- CU has more than 64 luma samples;
- Both CU height and CU width are larger than or equal to 8 luma samples;
- BCW weight index indicates equal weight;
- WP is not enabled for the current CU;
- CIIP mode is not used for the current CU.

BDOF is only applied to the luma component. As its name indicates, the BDOF mode is based on the optical flow concept, which assumes that the motion of an object is smooth. For each 4×4 subblock, a motion refinement ($v_x$, $v_y$) is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j),$$

k=0,1, of the two prediction signals are computed by directly calculating the difference between two neighboring samples, i.e., $$\frac{\partial I^{(k)}}{\partial x}(i,j) = \left(\left(I^{(k)}(i+1,j) \gg shift1\right) - \left(I^{(k)}(i-1,j) \gg shift1\right)\right) \quad (2\text{-}19)$$

$$\frac{\partial I^{(k)}}{\partial y}(i,j) = \left(\left(I^{(k)}(i,j+1) \gg shift1\right) - \left(I^{(k)}(i,j-1) \gg shift1\right)\right)$$

where $I^{(k)}$ (i,j) are the sample value at coordinate (i,j) of the prediction signal in list k, k=0,1, and shift1 is calculated based on the luma bit depth, bitDepth, as shift1=max(6, bitDepth-6). Then, the auto- and cross-correlation of the gradients, $S_1$, $S_2$, $S_3$, $S_5$ and $S_6$, are calculated as $$S_1 = \sum\nolimits_{(i,j)\in\Omega} \text{Abs}(\psi_x(i,j)),\ S_3 = \sum\nolimits_{(i,j)\in\Omega} \theta(i,j)\cdot\text{Sign}(\psi_x(i,j)) \quad (2\text{-}20)$$

$$S_2 = \sum_{(i,j)\in\Omega} \psi_x(i,j)\cdot Sign(\psi_y(i,j))$$

$$S_5 = \sum\nolimits_{(i,j)\in\Omega} \text{Abs}(\psi_y(i,j)),\ S_6 = \sum\nolimits_{(i,j)\in\Omega} \theta(i,j)\cdot\text{Sign}(\psi_y(i,j))$$

where $$\psi_x(i,j) = \left(\frac{\partial I^{(1)}}{\partial x}(i,j) + \frac{\partial I^{(0)}}{\partial x}(i,j)\right) \gg n_a \quad (2\text{-}21)$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

where Ω is a 6×6 window around the 4×4 subblock, and the values of $n_a$ and $n_b$ are set equal to min(1, bitDepth−11) and min(4, bitDepth−8), respectively.

The motion refinement ($v_x$, $v_y$) is then derived using the cross- and auto-correlation terms using the following:

$$(2\text{-}22)$$

$$v_x = S_1 > 0?\ clip3\left(-th'_{BIO},\ th'_{BIO},\ -\left((S_3\cdot 2^{n_b-n_a}) \gg \lfloor \log_2 S_1 \rfloor\right)\right):0$$

$$v_y = S_5 > 0?\ clip3\left(-th'_{BIO},\ th'_{BIO},\ -\left(\left(S_6\cdot 2^{n_b-n_a} - \left((v_x S_{2,m}) \ll n_{S_2} + v_x S_{2,s}\right)/2\right) \gg \lfloor \log_2 S_5 \rfloor\right)\right):0$$

where $S_{2,m} = S_2 \gg n_{S_2}$, $S_{2,s} = S_2 \,\&\, (2^{n_{S_2}} - 1)$, $th'_{BIO} = 2^{max(5,BD-7)}$. $\lfloor\cdot\rfloor$ is the floor function, and $n_{S_2} = 12$.

Based on the motion refinement and the gradients, the following adjustment is calculated for each sample in the 4×4 subblock:

$$b(x,y) = rnd\left(\left(v_x\left(\frac{\partial I^{(1)}(x,y)}{\partial x} - \frac{\partial I^{(0)}(x,y)}{\partial x}\right) + v_y\left(\frac{\partial I^{(1)}(x,y)}{\partial y} - \frac{\partial I^{(0)}(x,y)}{\partial y}\right) + 1\right)/2\right). \quad (2\text{-}23)$$

Finally, the BDOF samples of the CU are calculated by adjusting the bi-prediction samples as follows:

$$pred_{BDOF}(x,y) = \left(I^{(0)}(x,y) + I^{(1)}(x,y) + b(x,y) + 0_{offset}\right) \gg \text{shift}. \quad (2\text{-}24)$$

Figure 19:
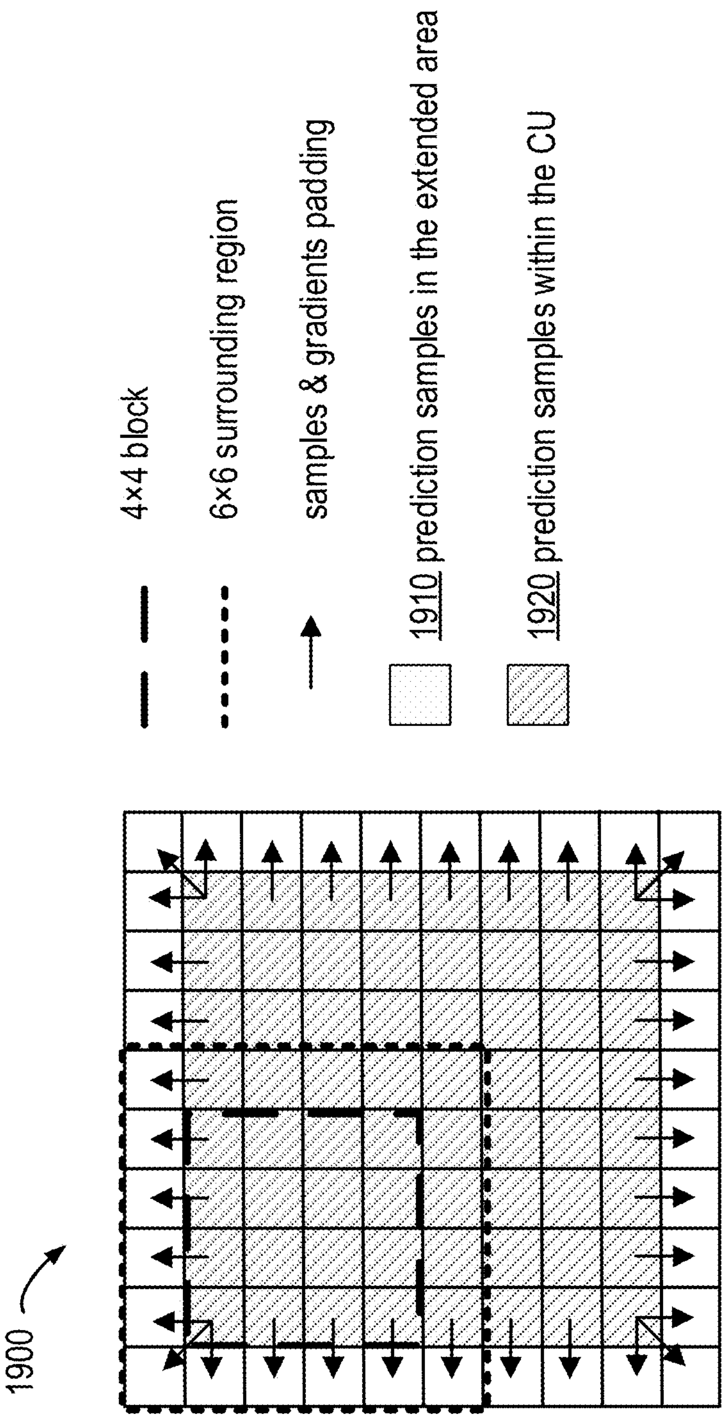
FIG. 19 shows an extended CU region used in BDOF.

These values are selected such that the multipliers in the BDOF process do not exceed 15-bit, and the maximum bit-width of the intermediate parameters in the BDOF process is kept within 32-bit. In order to derive the gradient values, some prediction samples $I^{(k)}$(i,j) in list k (k=0,1) outside of the current CU boundaries need to be generated. FIG. 19 illustrates a schematic diagram of extended CU region used in BDOF. As depicted in the diagram 1900 of FIG. 19, the BDOF in VVC uses one extended row/column around the CU's boundaries. In order to control the computational complexity of generating the out-of-boundary prediction samples, prediction samples in the extended area (denoted as 1910 in FIG. 19) are generated by taking the reference samples at the nearby integer positions (using floor( ) operation on the coordinates) directly without interpolation, and the normal 8-tap motion compensation interpolation filter is used to generate prediction samples within the CU (denoted as 1920 in FIG. 19). These extended sample values are used in gradient calculation only. For the remaining steps in the BDOF process, if any sample and gradient values outside of the CU boundaries are needed, they are padded (i.e. repeated) from their nearest neighbors. When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CIIP mode, BDOF is also disabled.

2.1.8. Decoder Side Motion Vector Refinement (DMVR)

Figure 20:
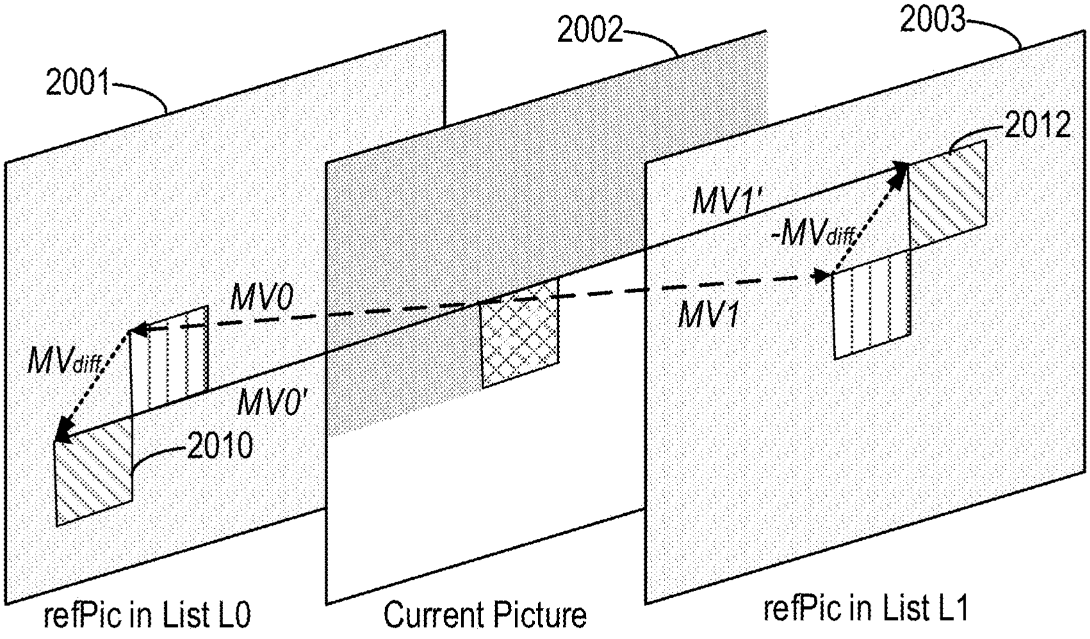
FIG. 20 shows decoding side motion vector refinement.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 20 is a schematic diagram illustrating the decoding side motion vector refinement. As illustrated in FIG. 20, the SAD between the blocks 2010 and 2012 based on each MV candidate around the initial MV is calculated, where the block 2010 is in a reference picture 2001 in the list L0 and the block 2012 is in a reference picture 2003 in the List L1 for the current picture 2002. The MV candidate with the lowest SAD becomes the refined MV and used to generate the bi-predicted signal.

In VVC, the application of DMVR is restricted and is only applied for the CUs which are coded with following modes and features:

CU level merge mode with bi-prediction MV;

One reference picture is in the past and another reference picture is in the future with respect to the current picture;

The distances (i.e. POC difference) from two reference pictures to the current picture are same;

Both reference pictures are short-term reference pictures;

CU has more than 64 luma samples;

Both CU height and CU width are larger than or equal to 8 luma samples;

BCW weight index indicates equal weight;

WP is not enabled for the current block;

CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding. The additional features of DMVR are mentioned in the following sub-clauses.

2.1.8.1. Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + \text{MV\_offset} \quad (2\text{-}25)$$

$$MV1' = MV1 - \text{MV\_offset} \quad (2\text{-}26)$$

where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \quad (2\text{-}27)$$

where ($x_{min}$, $Y_{min}$) corresponds to the fractional position with the least cost and C corresponds to the minimum cost value. By solving the above equations by using the cost value of the five search points, the ($x_{min}$, $Y_{min}$) is computed as:

$$x_{min} = (E(-1, 0) - E(1, 0))/(2(E(-1, 0) + E(1, 0) - 2E(0, 0))) \quad (2\text{-}28)$$

$$y_{min} = (E(0, -1) - E(0, 1))/(2((E(0, -1) + E(0, 1) - 2E(0, 0))). \quad (2\text{-}29)$$

The value of $x_{min}$ and $Y_{min}$ are automatically constrained to be between −8 and 8 since all cost values are positive and the smallest value is E(0,0). This corresponds to half peal offset with 1/16th-pel MV accuracy in VVC. The computed fractional ($x_{min}$, $Y_{min}$) are added to the integer distance refinement MV to get the sub-pixel accurate refinement delta MV.

2.1.8.2. Bilinear-Interpolation and Sample Padding

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.1.8.3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.1.9. Combined Inter and Intra Prediction (CIIP)

Figure 21:
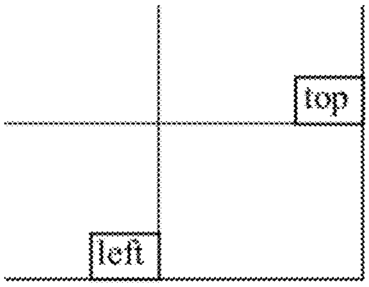
FIG. 21 shows top and left neighboring blocks used in CIIP weight derivation.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. FIG. 21 shows top and left neighboring blocks used in CIIP weight derivation. Then, the intra and inter prediction signals are combined using weighted averaging, where the weight value is calculated depending on the coding modes of the top and left neighbouring blocks (depicted in FIG. 21) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP} = ((4 - wt) * P_{inter} + wt * P_{intra} + 2) \gg 2. \quad (2\text{-}30)$$

2.1.10. Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size $w \times h = 2^m \times 2^n$ with m, n ∈ {3 . . . 6} excluding 8×64 and 64×8.

Figure 22:
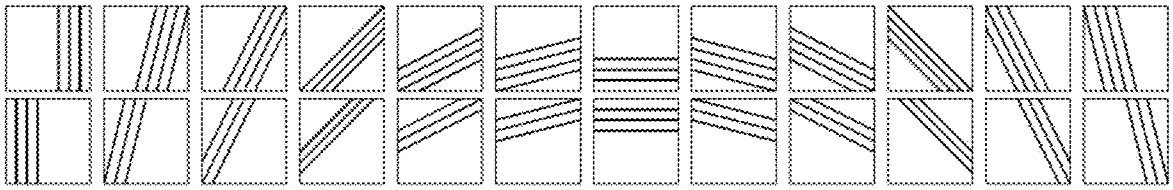
FIG. 22 shows examples of the GPM splits grouped by identical angles.

FIG. 22 shows examples of the GPM splits grouped by identical angles When this mode is used, a CU is split into two parts by a geometrically located straight line (FIG. 22). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights. This is the prediction signal for the whole CU, and transform and quantization process will be applied to the whole CU as in other prediction modes. Finally, the motion field of a CU predicted using the geometric partition modes is stored.

2.1.10.1.Uni-Prediction Candidate List Construction

Figures 23, 24:
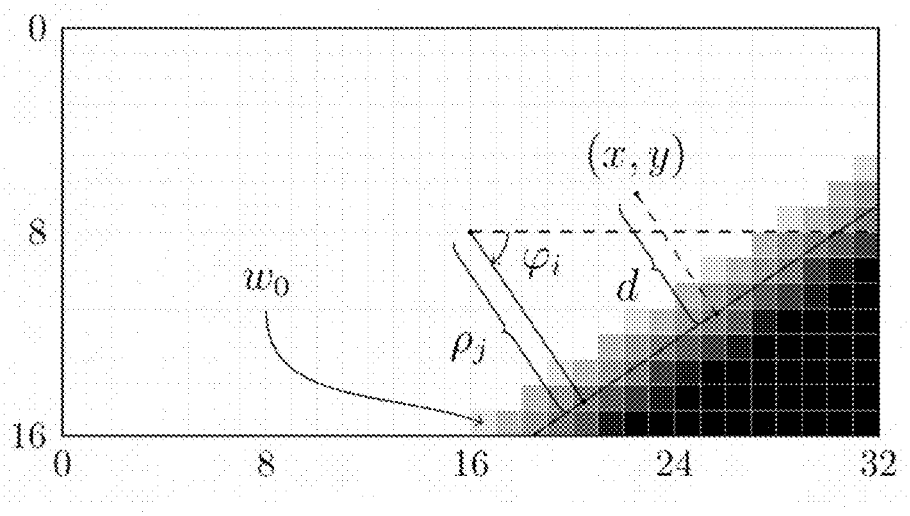
FIG. 23 shows uni-prediction MV selection for geometric partitioning mode.
FIG. 24 illustrates exemplified generation of a bending weight $w_0$ using geometric partitioning mode.

The uni-prediction candidate list is derived directly from the merge candidate list constructed according to the extended merge prediction process. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. FIG. 23 shows uni-prediction MV selection for geometric partitioning mode. These motion vectors are marked with "x" in FIG. 23. In case a corresponding LX motion vector of the n-the extended merge candidate does not exist, the L(1−X) motion vector of the same candidate is used instead as the uni-prediction motion vector for geometric partitioning mode.

2.1.10.2.Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j$$

$$\rho_j = \rho_{x,j}\cos(\varphi_i) + \rho_{y,j}\sin(\varphi_i)$$

$$\rho_{x,j} = \begin{cases} 0 & i \,\%\, 16 = 8 \text{ or } (i \,\%\, 16 \neq 0 \text{ and } h \geq w) \\ \pm(j \times w) \gg 2 & \text{otherwise} \end{cases}$$

$$\rho_{y,j} = \begin{cases} \pm(j \times h) \gg 2 & i \,\%\, 16 = 8 \text{ or } (i \,\%\, 16 \neq 0 \text{ and } h \geq w) \\ 0 & \text{otherwise} \end{cases}$$

where i,j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx \ ? \ 32 + d(x, y) : 32 - d(x, y)$$

$$w_0(x, y) = \frac{Clip3(0, 8, (wIdxL(x, y) + 4) \gg 3)}{8}$$

$$w_1(x, y) = 1 - w_0(x, y).$$

The partIdx depends on the angle index i. FIG. 24 shows exemplified generation of a bending weight $w_0$ using geometric partitioning mode. One example of weigh $w_0$ is illustrated in FIG. 24.

2.1.10.3.Motion Field Storage for Geometric Partitioning Mode

Mv1 from the first part of the geometric partition, Mv2 from the second part of the geometric partition and a combined My of Mv1 and Mv2 are stored in the motion filed of a geometric partitioning mode coded CU.

The stored motion vector type for each individual position in the motion filed are determined as:

$$sType = \text{abs}(motionIdx) < 32 \ ? \ 2 : (motionIdx \leq 0 \ ? \ (1 - partIdx) : partIdx)$$

where motionIdx is equal to d(4x+2, 4y+2). The partIdx depends on the angle index i.

If sType is equal to 0 or 1, Mv0 or Mv1 are stored in the corresponding motion field, otherwise if sType is equal to 2, a combined My from Mv0 and Mv2 are stored. The combined My are generated using the following process:

1) If Mv1 and Mv2 are from different reference picture lists (one from L0 and the other from L1), then Mv1 and Mv2 are simply combined to form the bi-prediction motion vectors.
2) Otherwise, if Mv1 and Mv2 are from the same list, only uni-prediction motion Mv2 is stored.

2.1.11. Local Illumination Compensation (LIC)

LIC is an inter prediction technique to model local illumination variation between current block and its prediction block as a function of that between current block template and reference block template. The parameters of the function can be denoted by a scale $\alpha$ and an offset $\beta$, which forms a linear equation, that is, $\alpha*p[x]+\beta$ to compensate illumination changes, where p[x] is a reference sample pointed to by MV at a location x on reference picture. Since $\alpha$ and $\beta$ can be derived based on current block template and reference block template, no signaling overhead is required for them, except that an LIC flag is signaled for AMVP mode to indicate the use of LIC.

The local illumination compensation proposed in JVET-00066 is used for uni-prediction inter CUs with the following modifications.

- Intra neighbor samples can be used in LIC parameter derivation;
- LIC is disabled for blocks with less than 32 luma samples;
- For both non-subblock and affine modes, LIC parameter derivation is performed based on the template block samples corresponding to the current CU, instead of partial template block samples corresponding to first top-left 16×16 unit;
- Samples of the reference block template are generated by using MC with the block MV without rounding it to integer-pel precision.

2.1.12. Non-Adjacent Spatial Candidate

Figure 25:
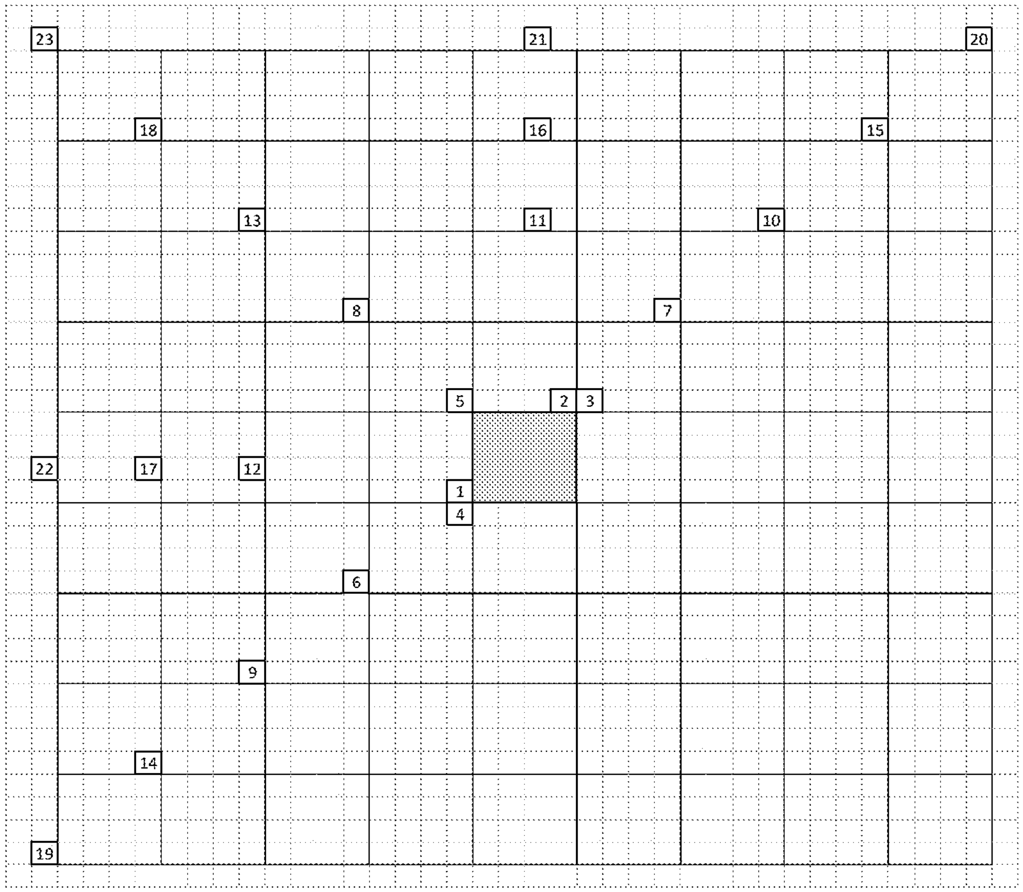
FIG. 25 shows spatial neighboring blocks used to derive the spatial merge candidates.

The non-adjacent spatial merge candidates as in JVET-L0399 are inserted after the TMVP in the regular merge candidate list. FIG. 25 shows spatial neighboring blocks used to derive the spatial merge candidates. The pattern of spatial merge candidates is shown in FIG. 25. The distances between non-adjacent spatial candidates and current coding block are based on the width and height of current coding block. The line buffer restriction is not applied.

2.1.13. Template Matching (TM)

Figure 26:
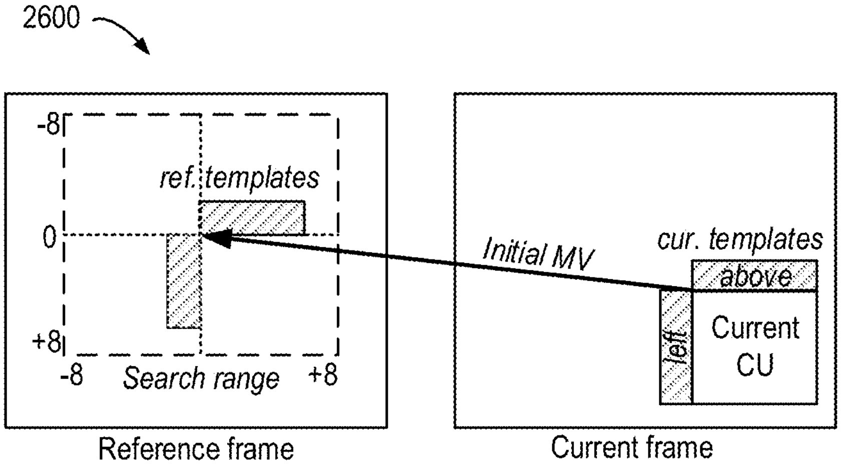
FIG. 26 shows template matching performs on a search area around initial MV.

Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. FIG. 26 is a schematic diagram 2600 illustrating the template matching that performs on a search area around initial MV. As illustrated in FIG. 26, a better MV is to be searched around the initial motion of the current CU within a [−8, +8]-pel search range. The template matching that was previously proposed in JVET-J0021 is adopted in this contribution with two modifications: search step size is determined based on Adaptive Motion Vector Resolution (AMVR) mode and TM can be cascaded with bilateral matching process in merge modes.

In AMVP mode, an MVP candidate is determined based on template matching error to select the one which reaches the minimum difference between the current block template and the reference block template, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 3. This search process ensures that the MVP candidate still keeps the same MV precision as indicated by the AMVR mode after TM process.

TABLE 3

Search patterns of AMVR and merge mode with AMVR.

| Search pattern | AMVR mode 4-pel | AMVR mode Full-pel | AMVR mode Half-pel | AMVR mode Quarter-pel | Merge mode AltIF = 0 | Merge mode AltIF = 1 |
|---|---|---|---|---|---|---|
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As Table 3 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

2.1.14. Multi-Pass Decoder-Side Motion Vector Refinement (mpDMVR)

A multi-pass decoder-side motion vector refinement is applied. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

2.1.14.1.First Pass—Block Based Bilateral Matching MV Refinement

In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$\mathrm{MV0\_pass1} = MV0 + deltaMV$$

$$\mathrm{MV1\_pass1} = MV1 - deltaMV.$$

2.1.14.2. Second Pass—Subblock Based Bilateral Matching MV Refinement

In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2 (sbIdx2) and MV1_pass2(sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

Figure 27:
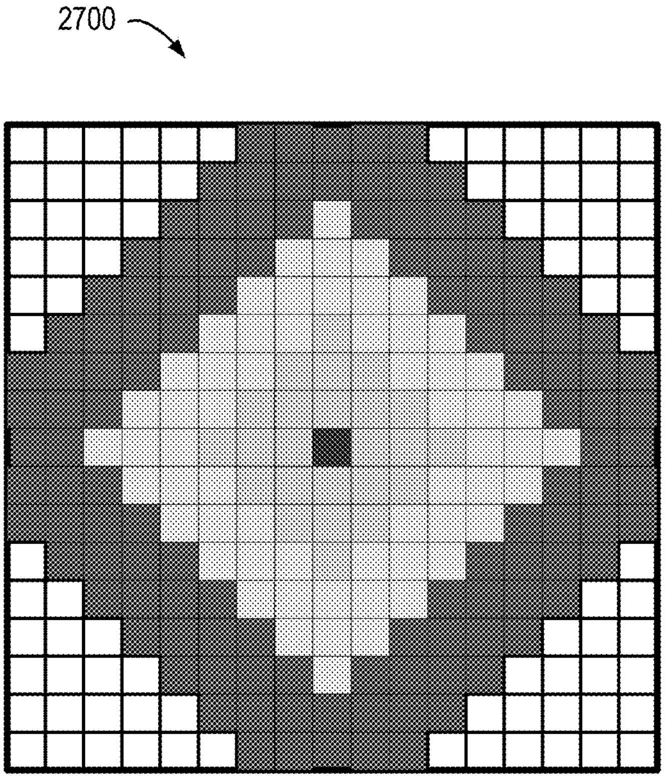
FIG. 27 shows diamond regions in the search area.

The bilateral matching cost is calculated by applying a cost factor to the SATD cost between two reference subblocks, as: bilCost=satdCost*costFactor. The search area (2*sHor+1)*(2*sVer+1) is divided up to 5 diamond shape search regions shown in in the diagram 2700 of FIG. 27. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined.

The existing VVC DMVR fractional sample refinement is further applied to derive the final deltaMV(sbIdx2). The refined MVs at second pass is then derived as:

$$\mathrm{MV0\_pass2}(sbIdx2) = \mathrm{MV0\_pass1} + deltaMV(sbIdx2)$$

$$\mathrm{MV1\_pass2}(sbIdx2) = \mathrm{MV1\_pass1} - deltaMV(sbIdx2).$$

2.1.14.3. Third Pass—Subblock Based Bi-Directional Optical Flow MV Refinement In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32.

The refined MVs (MV0_pass3(sbIdx3) and MV1_pass3 (sbIdx3)) at third pass are derived as:

$$\mathrm{MV0\_pass3}(sbIdx3) = \mathrm{MV0\_pass2}(sbIdx2) + bioMV$$

$$\mathrm{MV1\_pass3}(sbIdx3) = \mathrm{MV0\_pass2}(sbIdx2) - bioMV.$$

2.1.15. OBMC

When OBMC is applied, top and left boundary pixels of a CU are refined using neighboring block's motion information with a weighted prediction as described in JVET-L0101.

Conditions of not applying OBMC are as follows:

When OBMC is disabled at SPS level;

When current block has intra mode or IBC mode;

When current block applies LIC;

When current luma block area is smaller or equal to 32.

A subblock-boundary OBMC is performed by applying the same blending to the top, left, bottom, and right subblock boundary pixels using neighboring subblocks' motion information. It is enabled for the subblock based coding tools:

Affine AMVP modes;

Affine merge modes and subblock-based temporal motion vector prediction (SbTMVP);

Subblock-based bilateral matching.

2.1.16. Sample-Based BDOF

In the sample-based BDOF, instead of deriving motion refinement (Vx, Vy) on a block basis, it is performed per sample.

The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

2.1.17. Interpolation

Figure 28:
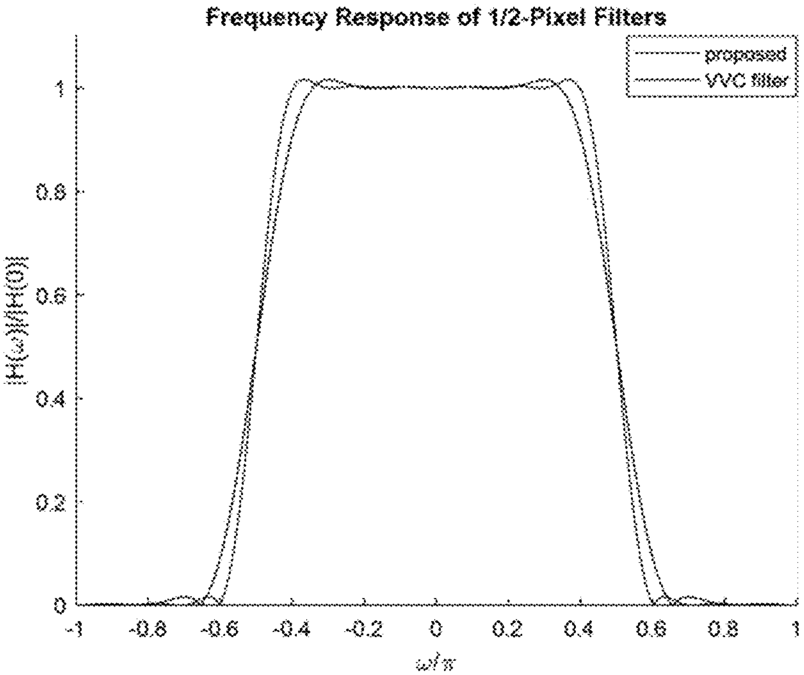
FIG. 28 shows frequency response of the interpolation filter and the VVC interpolation filter at half-pel phase.

The 8-tap interpolation filter used in VVC is replaced with a 12-tap filter. The interpolation filter is derived from the sinc function of which the frequency response is cut off at Nyquist frequency, and cropped by a cosine window function. Table 4 gives the filter coefficients of all 16 phases. FIG. 28 shows frequency responses of the interpolation filter and the VVC interpolation filter at half-pel phase. It compares the frequency responses of the interpolation filters with the VVC interpolation filter, all at half-pel phase.

TABLE 4

| Filter coefficients of the 12-tap interpolation filter | | | | | | | | | | | | |
|---|---|---|---|---|---|---|---|---|---|---|---|---|
| 1/16 | −1 | 2 | −3 | 6 | −14 | 254 | 16 | −7 | 4 | −2 | 1 | 0 |
| 2/16 | −1 | 3 | −7 | 12 | −26 | 249 | 35 | −15 | 8 | −4 | 2 | 0 |
| 3/16 | −2 | 5 | −9 | 17 | −36 | 241 | 54 | −22 | 12 | −6 | 3 | −1 |
| 4/16 | −2 | 5 | −11 | 21 | −43 | 230 | 75 | −29 | 15 | −8 | 4 | −1 |
| 5/16 | −2 | 6 | −13 | 24 | −48 | 216 | 97 | −36 | 19 | −10 | 4 | −1 |
| 6/16 | −2 | 7 | −14 | 25 | −51 | 200 | 119 | −42 | 22 | −12 | 5 | −1 |
| 7/16 | −2 | 7 | −14 | 26 | −51 | 181 | 140 | −46 | 24 | −13 | 6 | −2 |
| 8/16 | −2 | 6 | −13 | 25 | −50 | 162 | 162 | −50 | 25 | −13 | 6 | −2 |
| 9/16 | −2 | 6 | −13 | 24 | −46 | 140 | 181 | −51 | 26 | −14 | 7 | −2 |
| 10/16 | −1 | 5 | −12 | 22 | −42 | 119 | 200 | −51 | 25 | −14 | 7 | −2 |
| 11/16 | −1 | 4 | −10 | 19 | −36 | 97 | 216 | −48 | 24 | −13 | 6 | −2 |
| 12/16 | −1 | 4 | −8 | 15 | −29 | 75 | 230 | −43 | 21 | −11 | 5 | −2 |
| 13/16 | −1 | 3 | −6 | 12 | −22 | 54 | 241 | −36 | 17 | −9 | 5 | −2 |
| 14/16 | 0 | 2 | −4 | 8 | −15 | 35 | 249 | −26 | 12 | −7 | 3 | −1 |
| 15/16 | 0 | 1 | −2 | 4 | −7 | 16 | 254 | −14 | 6 | −3 | 2 | −1 |

2.1.18. Multi-Hypothesis Prediction (MHP)

In the multi-hypothesis inter prediction mode (JVET-M0425), one or more additional motion-compensated prediction signals are signaled, in addition to the conventional bi prediction signal. The resulting overall prediction signal is obtained by sample-wise weighted superposition. With the bi prediction signal $P_{bi}$ and the first additional inter prediction signal/hypothesis $h_3$, the resulting prediction signal $P_3$ is obtained as follows:

$$p_3 = (1-\alpha)p_{bi} + \alpha h_3.$$

The weighting factor α is specified by the new syntax element add_hyp_weight_idx, according to the following mapping.

| add_hyp_weight_idx | α |
|---|---|
| 0 | 1/4 |
| 1 | −1/8 |

Analogously to above, more than one additional prediction signal can be used. The resulting overall prediction signal is accumulated iteratively with each additional prediction signal.

$$p_{n+1} = (1-\alpha_{n+1})p_n + \alpha_{n+1}h_{n+1}$$

The resulting overall prediction signal is obtained as the last $p_n$ (i.e., the $P_n$ having the largest index n). Within this EE, up to two additional prediction signals can be used (i.e., n is limited to 2). The motion parameters of each additional prediction hypothesis can be signaled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode.

Combination of MHP and BDOF is possible, however the BDOF is only applied to the bi-prediction signal part of the prediction signal (i.e., the ordinary first two hypotheses).

2.1.19. Adaptive Reordering of Merge Candidates with Template Matching (ARMC-TM)

The merge candidates are adaptively reordered with template matching (TM). The reordering method is applied to regular merge mode, template matching (TM) merge mode, and affine merge mode (excluding the SbTMVP candidate). For the TM merge mode, merge candidates are reordered before the refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on template matching. For simplification, merge candidates in the last but not the first subgroup are not reordered.

The template matching cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

Figure 29:
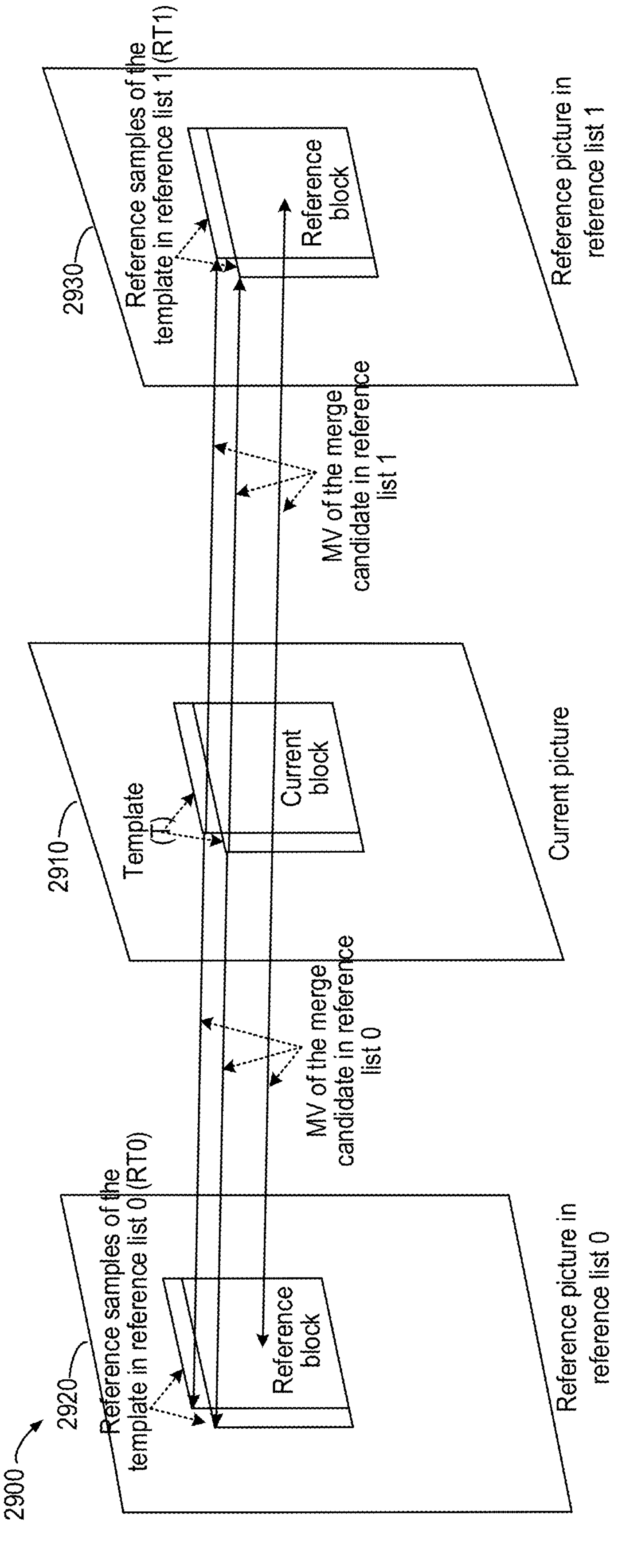
FIG. 29 shows template and reference samples of the template in reference pictures.

FIG. 29 shows a schematic diagram 2900 of template and reference samples of the template in reference list 0 and reference list 1. When a merge candidate utilizes bi-directional prediction, the reference samples of the template of the merge candidate are also generated by bi-prediction as shown in FIG. 29. When a merge candidate utilizes bi-directional prediction, the reference samples of the template of the merge candidate are denoted by RT and RT may be generated from $RT_0$ which are derived from a reference picture 2920 in reference picture list 0 and $RT_1$ derived from a reference picture 2930 in reference picture list 1. In one example, $RT_0$ includes a set of reference samples on the reference picture 2920 of the current block in the current picture 2910 indicated by the reference index of the merge candidate referring to a reference picture in reference list 0 with the MV of the merge candidate referring to reference list 0, In one example, $RT_1$ includes a set of reference samples on the reference picture 2930 of the current block indicated by the reference index of the merge candidate referring to a reference picture in reference list 1 with the MV of the merge candidate referring to reference list 1. For subblock-based merge candidates with subblock size equal to Wsub×Hsub, the above template comprises several sub-templates with the size of Wsub×1, and the left template comprises several sub-templates with the size of 1×Hsub.

Figure 30:
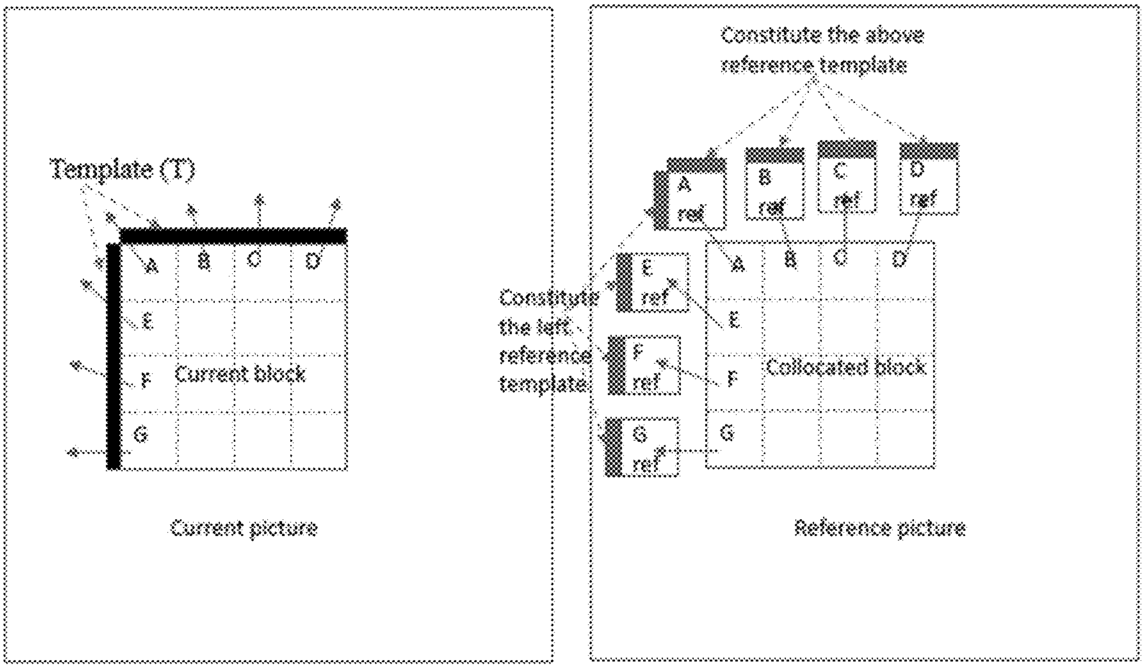
FIG. 30 shows template and reference samples of the template for block with sub-block motion using the motion information of the subblocks of the current block.

FIG. 30 shows template and reference samples of the template for block with sub-block motion using the motion information of the subblocks of the current block. As shown in FIG. 30, the motion information of the subblocks in the first row and the first column of current block is used to derive the reference samples of each sub-template.

2.1.20. Geometric Partitioning Mode (GPM) with Merge Motion Vector Differences (MMVD)

GPM in VVC is extended by applying motion vector refinement on top of the existing GPM uni-directional MVs. A flag is first signalled for a GPM CU, to specify whether this mode is used. If the mode is used, each geometric partition of a GPM CU can further decide whether to signal MVD or not. If MVD is signalled for a geometric partition, after a GPM merge candidate is selected, the motion of the partition is further refined by the signalled MVDs information. All other procedures are kept the same as in GPM.

The MVD is signaled as a pair of distance and direction, similar as in MMVD. There are nine candidate distances (¼-pel, 1/1-pel, 1-pel, 2-pel, 3-pel, 4-pel, 6-pel, 8-pel, 16-pel), and eight candidate directions (four horizontal/vertical directions and four diagonal directions) involved in GPM with MMVD (GPM-MMVD). In addition, when pic_fpel_mmvd_enabled_flag is equal to 1, the MVD is left shifted by 2 as in MMVD.

2.1.21. Geometric Partitioning Mode (GPM) with Template Matching (TM)

Template matching is applied to GPM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 5. The motion is then refined by minimizing the difference between the current template and the template in the reference picture using the same search pattern of merge mode with half-pel interpolation filter disabled.

TABLE 5

Template for the 1st and 2nd geometric partitions, where A represents using above samples, L represents using left samples, and L + A represents using both left and above samples.

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |
| Partition angle | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

A GPM candidate list is constructed as follows:

1. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.
2. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.
3. Zero MV candidates are padded until the GPM candidate list is full.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

2.1.22. GPM Woth Inter and Intra Prediction (GPM Inter-Intra)

With the GPM inter-intra, pre-defined intra prediction modes against geometric partitioning line can be selected in addition to merge candidates for each non-rectangular split region in the GPM-applied CU. In the proposed method, whether intra or inter prediction mode is determined for each GPM-separated region with a flag from the encoder. When the inter prediction mode, a uni-prediction signal is generated by MVs from the merge candidate list. On the other hand, when the intra prediction mode, a uni-prediction signal is generated from the neighboring pixels for the intra prediction mode specified by an index from the encoder. The variation of the possible intra prediction modes is restricted by the geometric shapes. Finally, the two uni-prediction signals are blended with the same way of ordinary GPM.

2.1.23. Adaptive Decoder Side Motion Vector Refinement (Adaptive DMVR)

Adaptive decoder side motion vector refinement method consists of the two new merge modes introduced to refine MV only in one direction, either L0 or L1, of the bi prediction for the merge candidates that meet the DMVR conditions. The multi-pass DMVR process is applied for the selected merge candidate to refine the motion vectors, however either MVD0 or MVD1 is set to zero in the 1st pass (i.e. PU level) DMVR.

Like the regular merge mode, merge candidates for the proposed merge modes are derived from the spatial neighboring coded blocks, TMVPs, non-adjacent blocks, HMVPs, and pair-wise candidate. The difference is that only those meet DMVR conditions are added into the candidate list. The same merge candidate list is used by the two proposed merge modes and merge index is coded as in regular merge mode.

2.1.24. Bilateral Matching AMVP-MERGE Mode (AMVP-MERGE)

In the AMVP-merge mode, the bi-directional predictor is composed of an AMVP predictor in one direction and a merge predictor in the other direction.

AMVP part of the proposed mode is signaled as a regular uni-directional AMVP, i.e. reference index and MVD are signaled, and it has a derived MVP index if template matching is used (TM_AMVP) or MVP index is signaled when template matching is disabled. Merge index is not signalled, and merge predictor is selected from the candidate list with smallest template or bilateral matching cost. When the selected merge predictor and the AMVP predictor satisfy DMVR condition, which is there is at least one reference picture from the past and one reference picture from the future relatively to the current picture and the distances from two reference pictures to the current picture are the same, the bilateral matching MV refinement is applied for the merge MV candidate and AMVP MVP as a starting point. Otherwise, if template matching functionality is enabled, template matching MV refinement is applied to the merge predictor or the AMVP predictor which has a higher template matching cost.

The third pass which is 8×8 sub-PU BDOF refinement of the multi-pass DMVR is enabled to AMVP-merge mode coded block.

3. Problems

There are several issues in the existing video coding techniques, which would be further improved for higher coding gain.

1. In ECM-3.0, for AMVP modes, a best motion vector predictor is selected for L0 and L1 respectively, based on the TM cost. The best motion vector predictor of L0/L1 prediction is further refined by TM later on. However, DMVR is never used to select best motion vector predictor pairs for BI motion prediction, and the bi motion vector predictors is never refined by DMVR.
2. In ECM-3.0, the SMVD mode derives reference index pairs at slice level, which may be not optimal.
3. In ECM-3.0, multi-stage BDMVR is applied everywhere, without smart mechanism to differentiate single stage and multiple stage according to different coding methods.
    a. Additionally, the AMVP-MERGE mode uses 8×8 subblock based motion vector refinement, without cascading with 16×16 subblock based motion vector refinement, which may be enhanced.
4. In ECM-3.0, multi-stage (i.e., PU level, followed by 16×16 subblock level and 8×8 subbblock level) DMVR is applied, without checking whether it is necessary, and whether a second level DMVR is needed.

4. Embodiments of the Present Disclosure

The detailed embodiments below should be considered as examples to explain general concepts. These embodiments should not be interpreted in a narrow way. Furthermore, these embodiments can be combined in any manner.

The terms 'video unit' or 'coding unit' or 'block' may represent a coding tree block (CTB), a coding tree unit (CTU), a coding block (CB), a CU, a PU, a TU, a PB, a TB.

In the present disclosure, regarding "a block coded with mode N", here "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIIP, GPM, GEO, TPM, MMVD, BCW, HMVP, SbTMVP, and etc.).

In the present disclosure, "a two-direction-DMVR" may indicate regular DMVR which refines both L0 and L1 motion vectors, as elaborated in section 2.1.14. Moreover, "a one-direction-DMVR" may indicate a DMVR process which refines either L0 or L1 motion vector only, such as adaptive DMVR elaborated in section 2.1.23.

In the following discussion, the AMVP mode may be regular AMVP mode, affine-AMVP mode, and/or SMVD mode, and/or AMVP-MERGE mode.

It is noted that the terminologies mentioned below are not limited to the specific ones defined in existing standards. Any variance of the coding tool is also applicable.

4.1. To Tackle the First Problem, the Following Methods are Proposed a. In one example, a bi-motion vector predictor (MVP) candidate may be selected based on a DMVR cost and used for a video unit.
    i. For example, the video unit may be coded by regular AMVP mode, affine-AMVP mode, and/or SMVD mode, and/or AMVP-MERGE mode.
    ii. For example, more than one bi-MVP candidate may be constructed from available L0 and L1 MVP candidates.
        1) Furthermore, the refined L0 and L1 MVPs with one directional DMVR may also be considered.
    iii. For example, which bi-MVP candidate is used for the video unit may be based on a DMVR cost (i.e., by comparing the difference/error of L0 and L1 predictions identified by each bi-MVP candidate).
        1) Alternatively, which bi-MVP candidate is used for the video unit may be signalled in the bitstream.
b. In one example, a bi-motion vector predictor (MVP) (i.e., before adding the motion vector difference) of an AMVP mode may be refined by decoder side motion vector derivation methods such as TM and/or DMVR.
    i. For example, the AMVP mode may be regular AMVP mode, affine-AMVP mode, and/or SMVD mode, and/or AMVP-MERGE mode.
    ii. For example, if the bi-MVP satisfies the DMVR condition (e.g., from two difference directions with equal POC distance), DMVR motion vector refinement (e.g., PU/CU level DMVR) may be applied to such bi-MVP.
    iii. For example, if the bi-MVP does NOT satisfy the DMVR condition (e.g., from two difference directions with different POC distance), TM motion vector refinement may be applied to each side (L0-MVP and L1-MVP) respectively to refine such bi-MVP.
    iv. For example, the MVP refinement method may be signaled at different levels, such as SPS, PPS, slice, CTU, CU, and PU.
    v. For example, the MVP refinement method may be inferred at PU level depending on the condition if DMVR condition is satisfied. For example, if DMVR condition is satisfied, the DMVR is used to refine MVP; otherwise, TM is used.

c. In one example, the motion vector (i.e., after adding up the motion vector difference to the motion vector predictor) of an AMVP mode may be refined by a DMVR or TM process.
  i. For example, the AMVP mode may be regular AMVP mode, and/or SMVD mode, and/or AMVP-MERGE mode.
  ii. For example, the DMVR process may be a subblock level DMVR process.
  iii. Alternatively, the DMVR process may be a PU level DMVR process.
  iv. Alternatively, the DMVR process may be a PU level DMVR process followed by a subblock level DMVR process.
  v. For example, the TM process may be applied to refine the motion vector if DMVR condition is not satisfied.
  vi. Alternatively, the MV refinement method may be signaled at different levels, such as SPS, PPS, slice, CTU, CU, and PU.

d. In one example, the rule of bi-MVP candidate list generation may be different from the rule of uni-MVP candidate list generation.
  i. For example, a bi-MVP candidate list may be generated for an AMVP mode, in which a bi-MVP candidate is NOT directly combine elements from uni-predicted AMVP lists (e.g., directly combination means concatenating one element from the L0-MVP candidate list, and another element from the L1-MVP candidate list).
  ii. For example, for a certain AMVP-coded video unit, a first rule may be used for L0- or L1-MVP candidate list construction, while a second rule may be used for bi-MVP candidate list construction.
    1) For example, uni-prediction MVP candidates may be refined by a TM related method, then inserted to the L0- or L1-MVP candidate list.
    2) For example, bi-prediction MVP candidates may be refined by BM and/or TM related methods, then inserted to the bi-MVP candidate list.
  iii. For example, for a certain AMVP-coded video unit, a first rule may be used to select a best MVP for L0 or L1 prediction, while a second rule may be used to select a best bi-MVP candidate for bi-prediction.
    1) For example, TM based cost evaluation methods may be used to select a best MVP for L0 or L1 prediction.
    2) For example, BM and/or TM based cost evaluation methods may be used to select a best bi-MVP for bi-prediction.
  iv. For example, the signaling MVP for bi-prediction PU may be different from un-prediction PU.
    1) For example, the bi-prediction MV predictor for two directions are jointly derived/represented/coded.
      a. For example, the selected MVP index in the bi-prediction MVP candidate list is coded directly.
      b. For example, the selected MVP index in the bi-prediction MVP candidate list may be not explicitly coded but implicitly derived based on a certain decoder side derivation based method (such as DMVR or TM).
    2) Furthermore, alternatively, the bi-prediction MVP candidate list may be reordered by DMVR or TM cost for the bi-prediction with each bi-prediction MVP candidate.

e. In one example, the rules of MVP candidates' generation may be different, depending on the coding method (e.g., regular AMVP or SMVD) of the video unit.
  i. For example, the rule of bi-MVP candidate list generation for SMVD mode may be based on DMVR, while the rule of that for regular AMVP mode may NOT be based on DMVR (e.g., based on TM, or, neither DMVR nor TM).
  ii. For example, a best MVP candidate is selected for SMVD mode, which may be different from the MVP candidate selection for other coding modes such as regular AMVP.
    1) For example, a best MVP is selected for L0 and L1 respectively based on TM cost and used for regular AMVP, however, the best MVP for SMVD may be reselected from all available L0 and L1 MVP candidates following a new rule (other than reusing the L0 and L1 MVP selection process of regular AMVP).

f. In one example, if a bi-MVP (with DMVR or without DMVR) is applied, signaling of MVP index for each list may be skipped.

g. In one example, a first syntax element (such as a flag) may be signaled to indicate whether bi-MVP is used for a AMVP coded block.
  i. For example, the AMVP mode may be regular AMVP mode, affine-AMVP mode, and/or SMVD mode, and/or AMVP-MERGE mode.
  ii. For example, a bi-MVP may be generated by DMVR.
  iii. For example, multiple bi-MVPs may be used.
    1) A second syntax element may be signaled to indicate the selected bi-MVP, if it is indicated that bi-MVP is used.
  iv. For example, if it is indicated that bi-MVP is used, signaling of MVP index for each list may be skipped.

h. In one example, whether to and/or how to apply bi-MVP may depend on information signaled or derived in sequence/picture/slice/CU level.
  i. In one example, bi-MVP cannot be used if all reference pictures come from the same direction (all from forward or all from backward).
  ii. In one example, bi-MVP cannot be used if it is indicated that MVD-1 (i.e., the MVD of reference list 1) is not signaled (e.g. ph_mvd_11_zero_flag defined in VVC is equal to 1).

4.2. To Tackle the Second Problem, the Following Methods are Proposed i. In one example, a best reference index pair (i.e., L0-refIdx and L1-refIdx) for SMVD may be decided at block level other than slice level.
  i. For example, the reference index pair used for SMVD mode may NOT be decided by the POC distance (e.g., curPoc-refL0Poc and curPoc-refL1Poc).
  ii. For example, the reference index pair used for SMVD mode may NOT be decided at slice level.
  iii. For example, the reference index pair used for SMVD mode may be decided at block level.

j. In one example, a list of reference index pairs may be generated from all available reference pictures, and which reference index pair is used for the SMVD coded video unit may be derived based on DMVR cost.

i. For example, MVP candidates may be used to identify the bilateral matching blocks in both L0 reference and L1 reference, and the DMVR cost is then conducted by comparing the difference/error/cost between L0 and L1 reference blocks.

1) For example, the MVP candidates of L0 and L1 may be signalled in the bitstream.

2) Moreover, alternatively, the MVP candidates of L0 and L1 may be selected by DMVD methods such as DMVR and/or TM.

3) Moreover, alternatively, the MVP candidates of L0 and L1 may be refined by DMVD methods such as DMVR and/or TM.

ii. Alternatively, in such case, which reference index pair is used for the SMVD coded video unit may be signalled in the bitstream.

1) The reference index pair may be signalled under some conditions. For example, only when DMVR/TM matching cost of the first pair of reference pictures is not the best one compared with other pairs.

4.3. To Tackle the Third Problem, the Following Methods are Proposed k. In one example, the number of stages of motion vector refinement for a DMVR process for a block may depend on available coding information, and/or the granularity of DMVR process for a block may depend on available coding information.

i. For example, only PU/CU level DMVR may be applied for a certain coding mode.

ii. For example, only a certain subblock level (such as 16×16, or 8×8) DMVR may be applied for a certain coding mode.

iii. For example, for a AMVP coded video unit, subblock level DMVR motion refinement may be allowed to refine the motion vectors reconstructed from adding the motion vector difference to the motion vector predictor, whereas PU/CU level DMVR motion refinement may be not used to refine such reconstructed motion vectors.

iv. For example, for a AMVP coded video unit, PU/CU level DMVR motion refinement may be allowed to refine the motion vector predictors (before adding up the motion vector difference), whereas subblock level DMVR motion refinement may not be used to refine such motion vector predictors.

v. For example, only M×N subblock based DMVR may be applied for a certain coding mode.

1) For example, M=N=16.

2) For example, M=N=8.

3) For example, M=N=4.

l. In one example, a DMVR process may contain multiple stages motion vector refinement.

i. For example, a PU/CU based DMVR, and at least one subblock based DMVR are cascaded for motion vector refinement.

ii. For example, X (wherein X is a constant, e.g., X=3 or 2) stages DMVR based motion refinement may be applied, wherein each stage contains its own granularity.

1) For example (X=3), PU/CU based DMVR is applied first, followed by a K×K (such as K=16) subblock based DMVR, and further cascaded with an L×L (such as L=8) subblock based DMVR, to get the final refined motion field.

2) For example (X=2), PU/CU based DMVR is applied first, and cascaded with a K×K (such as K=8) subblock based DMVR, to get the final refined motion field.

m. In one example, whether to apply single DMVR process or multi-stage DMVR process may be dependent on the coding methods (e.g., regular merge, MMVD, CIIP, GPM, BM, TM, AMVP, SMVD, AMVP-MERGE, MHP, etc.).

4.4. To Tackle the Fourth Problem, the Following Methods are Proposed n. In one example, whether to apply a DMVR process to a video unit, may be dependent on a function with prediction samples from L0 and L1 as input.

i. In one example, whether to apply a DMVR process to a video unit, may be dependent on the distortion/cost/error by comparing L0 prediction and L1 prediction (which are identified by motion vectors before the DMVR process) of the current video unit.

ii. For example, the DMVR process may refer to both PU/CU level and subblock level DMVR.

iii. For example, the DMVR process may refer to either PU/CU level or subblock level DMVR.

iv. For example, if the cost/error is less than a threshold, the DMVR process may be not applied to the video unit.

v. Additionally, furthermore, the threshold may be dependent on the block dimensions of the current video unit.

vi. Additionally, furthermore, the video unit may be coded by MERGE, and/or AMVP based coding method.

o. In one example, whether to use the refined MV(s) provided by a DMVR process and/or update L0 and/or L1 motion vector after a DMVR process may be dependent on the results of the DMVR process.

i. For example, the DMVR process may refer to a PU/CU level DMVR.

ii. For example, the DMVR process may refer to a subblock level DMVR.

iii. For example, if the cost/error after a two-direction-DMVR process is less than a threshold, L0 and L1 motion vectors may be updated.

1) Alternatively, L0 and L1 motion vectors may not be updated (e.g., the BDMVR refined motion vectors are not used for the following motion compensation), if the cost after a two-direction-DMVR process is greater than or equal to a threshold.

iv. For example, if the distortion/cost/error of a one-direction-DMVR process is less than a threshold, L0 or L1 (depending on which direction of motion vector is supposed to be updated during the one-direction-DMVR process) motion vector may be updated.

1) Alternatively, L0 and/or L1 motion vectors may not be updated (e.g., the BDMVR refined motion vectors are not used for the following motion compensation), if the cost of one-direction-DMVR is greater than or equal to a threshold.

p. In one example, whether to perform a second level (e.g., K×K subblock level) DMVR process may be dependent on the results of the first level (e.g., PU/CU level) DMVR process.
   i. For example, whether to perform a second level DMVR process to a video unit, may be based on the cost/error after the first level DMVR process of this block.
   ii. Alternatively, whether to perform a second level DMVR process to a video unit, may be dependent on whether L0 and/or L1 motion vector is updated after the first level DMVR process.
   iii. Alternatively, whether to perform a second level DMVR process to a video unit, may be dependent on the MV difference of the current PU and its neighboring PU or CU.
      1) For example, if the MV difference is bigger than a predefined threshold, such as a half pixel, then the second level DMVR is applied.
   iv. For example, the first level DMVR process may be a two-direction-DMVR which refines both L0 and L1 motion vectors.
   v. For example, the first level DMVR process may be a one-direction-DMVR which refines either L0 or L1 motion vector.

General Aspects 4.5. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

4.6. Whether to and/or how to apply the disclosed methods above may be signalled at PB/TB/CB/PU/TU/CU/VPDU/CTU/CTU row/slice/tile/sub-picture/other kinds of region contain more than one sample or pixel.

4.7. Whether to and/or how to apply the disclosed methods above may be dependent on coded information, such as block size, colour format, single/dual tree partitioning, colour component, slice/picture type.

Embodiments of the present disclosure are related to motion candidate list construction.

As used herein, the term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular. For an IBC coded block, a block vector (BV) is used to indicate the displacement from the current block to a reference block, which is already reconstructed inside the current picture. Note that embodiments of the present disclosure may be applied to merge candidate list construction process for inter coded blocks (e.g., translational motion), affine coded blocks, TM coded blocks, GPM coded blocks, or IBC coded blocks; or other motion candidate list construction process (e.g., normal AMVP list; affine AMVP list; IBC AMVP list; HMVP table).

In the present disclosure, regarding "a block coded with mode N", here "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIIP, GPM, GEO, TPM, MMVD, BCW, HMVP, SbTMVP, and etc.).

Figure 31:
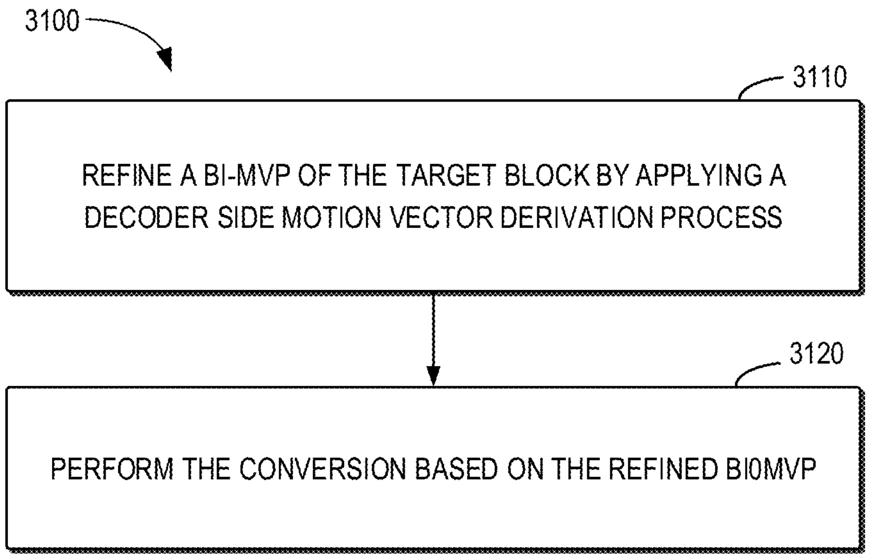
FIG. 31 illustrates a flow chart of a method according to embodiments of the present disclosure.

FIG. 31 illustrates a flowchart of a method 3100 for video processing in accordance with some embodiments of the present disclosure. The method 3100 may be implemented during a conversion between a video unit and a bitstream of the video unit.

As shown in FIG. 31, at block 3110, during a conversion between a target block of a video and a bitstream of the target block, a bi-motion vector predictor (MVP) of the target block is refined by applying a decoder side motion vector derivation process. The target block is coded with an advanced motion vector prediction (AMVP) mode. In some embodiments, the bi-MVP of the target block is refined before a motion vector difference is added. In one example, a bi-motion vector predictor (MVP) (i.e., before adding the motion vector difference) of an AMVP mode may be refined by decoder side motion vector derivation methods such as TM and/or DMVR.

At block 3120, the conversion is performed based on the refined bi-MVP. In some embodiments, the conversion may comprise ending the target block into the bitstream. Alternatively, the conversion may comprise decoding the target block from the bitstream. Compared with the conventional solution, some embodiments of the present disclosure can advantageously improve the coding efficiency, coding gain, coding performance, and flexibility.

In some embodiments, the decoder side motion vector derivation process comprises at least one of: a template matching (TM) process, or a decoder side motion vector refinement (DMVR) process. In some embodiments, the AMVP mode may include at least one of: an AMVP-MERGE mode, a regular AMVP mode, an affine-AMVP mode, or a symmetric motion vector difference (SMVD) mode.

In some embodiments, if the bi-MVP does not satisfy a DMVR condition, a TM motion vector refinement is applied to each side of the bi-MVP respectively to refine the bi-MVP. In some embodiments, if the bi-MVP is from two difference directions with different picture order count (POC) distances, the DMVR condition is not satisfied. For example, if the bi-MVP does NOT satisfy the DMVR condition (e.g., from two difference directions with different POC distance), TM motion vector refinement may be applied to each side (L0-MVP and L1-MVP) respectively to refine such bi-MVP. For example, the TM refinement, AMVP-merge is enabled for low-delay B case wherein the MVP is TM refined.

In some embodiments, if the bi-MVP satisfies a DMVR condition, a DMVR motion vector refinement is applied to the bi-MVP. In some embodiments, if the bi-MVP is from two difference directions with equal picture order count (POC) distance, the DMVR condition is satisfied. For example, if the bi-MVP satisfies the DMVR condition (e.g., from two difference directions with equal POC distance), DMVR motion vector refinement (e.g., PU/CU level DMVR) may be applied to such bi-MVP.

In some embodiments, a MVP refinement process is indicated at different levels. In some embodiments, the different levels comprise at least one of: a sequence parameter set (SPS), a picture parameter set (PPS), a slice, a coding tree unit (CTI), a coding unit (CU), or a prediction unit (PU). In some embodiments, a MVP refinement process is referred to at prediction unit (PU) level depending on whether a DMVR condition is satisfied. In some embodiments, if the DMVR condition is satisfied, a DMVR is used to refine the bi-MVP. In some embodiments, if the DMVR condition is not satisfied, a TM is used to refine the bi-MVP. For example, the MVP refinement method may be inferred at PU level depending on the condition if DMVR condition is satisfied. For example, if DMVR condition is satisfied, the DMVR is used to refine MVP; otherwise, TM is used.

In some embodiments, a bi-MVP candidate for the target block is selected based on a DMVR cost. In some embodiments, the target block is coded with at least one of: a regular AMVP mode, an affine-AMVP mode, a SMVD mode, or an AMVP-MERGE mode. In some embodiments, a plurality of bi-MVP candidates are constructed from available L0 MVP candidates and L1 MVP candidates. In some embodiments, the refined L0 and L1 MVPs with one directional DMVR are selected for the plurality of bi-MVP candidates.

In some embodiments, which bi-MVP candidate is used for the target block is based on a DMVR cost. For example, which bi-MVP candidate is used for the video unit may be based on a DMVR cost (i.e., by comparing the difference/error of L0 and L1 predictions identified by each bi-MVP candidate). In some embodiments, which bi-MVP candidate is used for the target block is indicated in the bitstream.

In some embodiments, a motion vector of the target block is refined by a DMVR process or a TM process. In one example, the motion vector (i.e., after adding up the motion vector difference to the motion vector predictor) of an AMVP mode may be refined by a DMVR or TM process.

In some embodiments, the target block is coded with at least one of: a regular AMVP mode, a SMVD mode, or an AMVP-MERGE mode. In some embodiments, the DMVR process comprises at least one of: a subblock level DMVR process, a PU level DMVR process, or a PU level DMVR process followed by a subblock level DMVR process.

In some embodiments, if a DMVR condition is not satisfied, the TM process is applied to refine the motion vector. In some embodiments, a refinement method of the motion vector is indicated at difference levels. For example, the MV refinement method may be signaled at different levels, such as SPS, PPS, slice, CTU, CU, and PU.

In some embodiments, a rule of bi-MVP candidate list generation is different from a rule of uni-MVP candidate list generation. In some embodiments, a bi-MVP candidate list is generated for an AMVP mode wherein a bi-MVP candidate does not directly combine elements from a uni-predicted AMVP list. For example, a bi-MVP candidate list may be generated for an AMVP mode, in which a bi-MVP candidate is not directly combine elements from uni-predicted AMVP lists (e.g., directly combination means concatenating one element from the L0-MVP candidate list, and another element from the L1-MVP candidate list).

In some embodiments, if the target bloc is coded with an AMVP mode, a first rule is used for a construction of a L0-MVP candidate list or L1-MVP candidate list, while a second rule is used for a bi-MVP candidate list construction. In some embodiments, uni-prediction MVP candidates are refined by a TM related process, and the refined uni-prediction MVP candidates are inserted to the L0-MVP candidate list or the L1-MVP candidate list. In some embodiments, bi-prediction MVP candidates are refined by at least one of: a bilateral matching (BM) related process or a TM related process, and the refined bi-prediction MVP candidates are inserted to the bi-MVP candidate list.

In some embodiments, if the target bloc is coded with an AMVP mode, a first rule is used to select a best MVP for L0 or L1 prediction, while a second rule is used to select a best bi-MVP candidate for bi-prediction. In some embodiments, a TM based cost evaluation process is used to select a best MVP for L0 and L1 prediction. In some embodiments, at least one of: a BM based cost evaluation or a TM based cost evaluation is used to select a best bi-MVP for bi-prediction.

In some embodiments, an indicated MVP for bi-prediction PU is different from uni-prediction PU. In some embodiments, a bi-prediction MVP for two predictions are jointly derived. In some embodiments, the bi-prediction MV predictor for two predictions are jointly represented. In some embodiments, the bi-prediction MV predictor for two predictions are jointly coded.

In some embodiments, a selected MVP index in a bi-prediction MVP candidate list is coded directly. In some embodiments, a selected MVP index in a bi-prediction MVP candidate list is not explicitly coded but implicitly derived based on a decoder side derivation based method. For example, the selected MVP index in the bi-prediction MVP candidate list may be not explicitly coded but implicitly derived based on a certain decoder side derivation based method (such as DMVR or TM). In some embodiments, a bi-prediction MVP candidate list is reordered by DMVR or TM cost for the bi-prediction with each bi-prediction MVP candidate.

In some embodiments, a rule of MVP candidate generation depends on a coding method of the target block. In one example, the rules of MVP candidates' generation may be different, depending on the coding method (e.g., regular AMVP or SMVD) of the video unit.

In some embodiments, a rule of bi-MVP candidate list generation for SMVD mode is based on DMVR, while a rule of bi-MVP candidate list generation for regular AMVP mode is not based on DMVR. For example, the rule of bi-MVP candidate list generation for SMVD mode may be based on DMVR, while the rule of that for regular AMVP mode may NOT be based on DMVR (e.g., based on TM, or, neither DMVR nor TM).

In some embodiments, a best MVP candidate is selected for SMVD mode. The selection of the best MVP candidate may be different from a MVP candidate selection for other coding modes, such as, regular AMVP.

In some embodiments, a best MVP for regular AMVP is selected for L0 and L1 respectively based on TM cost. In some embodiments, a best MVP for SMVD is reselected from all available L0 and L1 MVP candidates following a new rule. For example, a best MVP is selected for L0 and L1 respectively based on TM cost and used for regular AMVP, however, the best MVP for SMVD may be reselected from all available L0 and L1 MVP candidates following a new rule (other than reusing the L0 and L1 MVP selection process of regular AMVP).

In some embodiments, if the bi-MVP is applied, signaling of MVP index for each list is skipped. In one example, if a bi-MVP (with DMVR or without DMVR) is applied, signaling of MVP index for each list may be skipped.

In some embodiments, a first syntax element (for example, a flag) may be indicated to indicate whether bi-MVP is used for the target block that is coded with an AMVP mode. In some embodiments, the AMVP mode is at least one of: a regular AMVP mode, an affine-AMVP mode, a SMVD mode, or an AMVP-MERGE mode.

In some embodiments, a bi-MVP is generated by DMVR. In some embodiments, a plurality of bi-MVPs are used. For example, a second syntax element is indicated to indicate a selected bi-MVP, if bi-MVP is used. In some embodiments, if bi-MVP is used, singling of MVP index for each list is skipped.

In some embodiments, whether to and/or how to apply bi-MVP depends on information which is indicated or derived in one of the followings: a sequence level, a picture level, a slice level, or a CU level. In some embodiments, if all reference pictures are from a same direction, the bi-MVP is not applied. In one example, bi-MVP cannot be used if all reference pictures come from the same direction (all from forward or all from backward).

In some embodiments, if MVD-1 is not indicated, the bi-MVP is not applied. In one example, bi-MVP cannot be used if it is indicated that MVD-1 (i.e., the MVD of reference list 1) is not signaled (e.g. ph_mvd_l1_zero_flag defined in VVC is equal to 1).

In some embodiments, an indication of whether to and/or how to refine the bi-MVP of the target block by applying the decoder side motion vector derivation process is indicated at one of the followings: a sequence level, a group of pictures level, a picture level, a slice level, or a tile group level.

In some embodiments, an indication of whether to and/or how to refine the bi-MVP of the target block by applying the decoder side motion vector derivation process is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to refine the bi-MVP of the target block by applying the decoder side motion vector derivation process is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to refine the bi-MVP of the target block by applying the decoder side motion vector derivation process may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method may comprise: refining a bi-motion vector predictor (MVP) of a target block of the video by applying a decoder side motion vector derivation process, and wherein the target block is coded with an advanced motion vector prediction (AMVP) mode; and generating a bitstream of the target block based on the refined bi-MVP.

In some embodiments, a method for storing bitstream of a video, comprises: refining a bi-motion vector predictor (MVP) of a target block of the video by applying a decoder side motion vector derivation process, and wherein the target block is coded with an advanced motion vector prediction (AMVP) mode; generating a bitstream of the target block based on the refined bi-MVP; and storing the bitstream in a non-transitory computer-readable recording medium.

Figure 32:
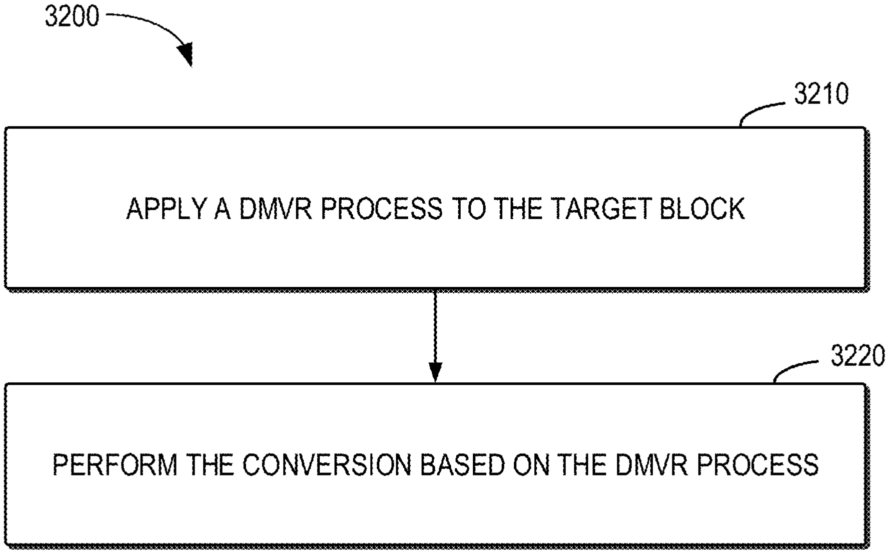
FIG. 32 illustrates a flow chart of a method according to embodiments of the present disclosure.

FIG. 32 illustrates a flowchart of a method 3200 for video processing in accordance with some embodiments of the present disclosure. The method 3200 may be implemented during a conversion between a video unit and a bitstream of the video unit.

As shown in FIG. 32, at block 3210, during a conversion between a target block of a video and a bitstream of the target block, a decoder side motion vector refinement (DMVR) process to the target block is applied. The DMVR process comprises one or more stages of motion vector refinements. In some embodiments, the DMVR process only comprises a single state motion vector refinement. In some embodiments, the number of states of the motion vector refinements for the DMVR process depends on available coding information. In some embodiments, a granularity of the DMVR process for the target block depends on available coding information.

At block 3220, the conversion is performed based on the DMVR process. In some embodiments, the conversion may comprise ending the target block into the bitstream. Alternatively, the conversion may comprise decoding the target block from the bitstream. Compared with the conventional solution, some embodiments of the present disclosure can advantageously improve the coding efficiency, coding gain, coding performance, and flexibility.

In some embodiments, if the target block is coded with a target coding mode, only prediction unit (PU) level DMVR is applied for the target block. In some embodiments, if the target block is coded with a target coding mode, only coding unit (CU) level DMVR is applied for the target block. For example, only PU/CU level DMVR may be applied for a certain coding mode. For example, for the affine merge DMVR only PU/CU level DMVR is used.

In some embodiments, if the target block is an advanced motion vector prediction (AMVP) coded block, a PU or CU level DMVR motion refinement is allowed to refine motion vector predictors of the target block. In some embodiments, subblock level DMVR motion refinement is not used to refine the motion vector predictors of the target block. For example, for a AMVP coded video unit, PU/CU level DMVR motion refinement may be allowed to refine the motion vector predictors (before adding up the motion vector difference), whereas subblock level DMVR motion refinement may not be used to refine such motion vector predictors.

In some embodiments, whether to apply a single DMVR process or multi-stage DMVR process depends on a coding method associated with the target block. In one example, whether to apply single DMVR process or multi-stage DMVR process may be dependent on the coding methods (e.g., regular merge, MMVD, CIIP, GPM, BM, TM, AMVP, SMVD, AMVP-MERGE, MHP, etc.). For example, PU/CU level DMVR only for affine merge DMVR mode, while multi-stage DMVR for regular merge DMVR mode.

In some embodiments, if the target block is coded with a target coding mode, only a target subblock level DMVR is applied for the target block. For example, only a certain subblock level (such as 16×16, or 8×8) DMVR may be applied for a certain coding mode.

In some embodiments, if the target block is an AMVP coded block, a subblock level DMVR motion refinement is allowed to refine motion vectors reconstructed from adding a motion vector difference to a motion vector predictor, and a PU or CU level DMVR motion refinement is not used to refine the reconstructed motion vectors. For example, for a AMVP coded video unit, subblock level DMVR motion refinement may be allowed to refine the motion vectors reconstructed from adding the motion vector difference to the motion vector predictor, whereas PU/CU level DMVR motion refinement may be not used to refine such reconstructed motion vectors.

In some embodiments, if the target block is coded with a target coding mode, only M*N subblock based DMVR is applied for the target block, and M and N are integer numbers. In some embodiments, M and N are equal to 16. In some embodiments, M and N are equal to 8. In some embodiments, M and N are equal to 4.

In some embodiments, the DMVR process comprises a multiple stages motion vector refinement. In some embodiments, a PU or CU based DMVR and at least one subblock based DMVR are cascaded for motion vector refinement.

In some embodiments, a first number of stages DMVR based motion refinement is applied, and wherein each stage comprises its own granularity. For example, X (wherein X is a constant, e.g., X=3 or 2) stages DMVR based motion refinement may be applied, wherein each stage contains its own granularity.

In some embodiments, if the first number is 3, the PU or CU based DMVR is applied first, followed by a K*K subblock based DMVR, and further cascaded with an L*L subblock based DMVR, to get a final refined motion field, and K and L are integer numbers. For example (X=3), PU/CU based DMVR is applied first, followed by a K×K (such as K=16) subblock based DMVR, and further cascaded with an L×L (such as L=8) subblock based DMVR, to get the final refined motion field.

In some embodiments, if the first number is 2, the PU or CU based DMVR is applied first, and cascaded with a K*K subblock based DMVR, to get a final refined motion field, and K is an integer number. For example (X=2), PU/CU based DMVR is applied first, and cascaded with a K×K (such as K=8) subblock based DMVR, to get the final refined motion field.

In some embodiments, an indication of whether to and/or how to apply the DMVR process that comprises one or more stages of motion vector refinements to the target block is indicated at one of the followings: a sequence level, a group of pictures level, a picture level, a slice level, or a tile group level.

In some embodiments, an indication of whether to and/or how to apply the DMVR process that comprises one or more stages of motion vector refinements to the target block is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to apply the DMVR process that comprises one or more stages of motion vector refinements to the target block is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to apply the DMVR process that comprises one or more stages of motion vector refinements to the target block may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method comprises: applying a decoder side motion vector refinement (DMVR) process to a target block of the video, wherein the DMVR process comprises one or more stages of motion vector refinements; and generating a bitstream of the target block based on the DMVR process.

In some embodiments, a method for storing bitstream of a video, comprises: applying a decoder side motion vector refinement (DMVR) process to a target block of the video, wherein the DMVR process comprises one or more stages of motion vector refinements; generating a bitstream of the target block based on the DMVR process; and storing the bitstream in a non-transitory computer-readable recording medium.

Figure 33:
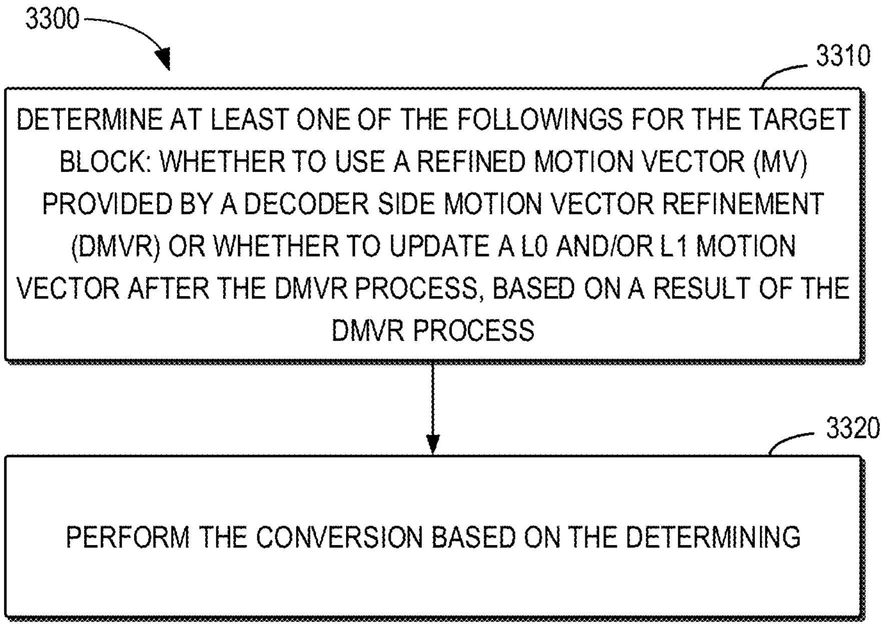
FIG. 33 illustrates a flow chart of a method according to embodiments of the present disclosure.

FIG. 33 illustrates a flowchart of a method 3300 for video processing in accordance with some embodiments of the present disclosure. The method 3300 may be implemented during a conversion between a video unit and a bitstream of the video unit.

As shown in FIG. 33, at block 3310, during a conversion between a target block of a video and a bitstream of the target block, at least one of the followings for the target block: whether to use a refined motion vector (MV) provided by a decoder side motion vector refinement (DMVR) or whether to update a L0 and/or L1 motion vector after the DMVR process is determined based on a result of the DMVR process. In one example, whether to use the refined MV(s) provided by a DMVR process and/or update L0 and/or L1 motion vector after a DMVR process may be dependent on the results of the DMVR process. For example, for affine merge DMVR mode (and other DMVR modes), a non-zero offset is resultant from the DMVR process only if a smaller cost can be obtained during the DMVR refinement.

At block 3320, the conversion is performed based on the determining. In some embodiments, the conversion may comprise ending the target block into the bitstream. Alternatively, the conversion may comprise decoding the target block from the bitstream. Compared with the conventional solution, some embodiments of the present disclosure can advantageously improve the coding efficiency, coding gain, coding performance, and flexibility.

In some embodiments, the DMVR process is at least one of: a PU or CU level DMVR process, or a subblock level DMVR.

In some embodiments, if a cost or error after a two-direction-DMVR process is less than a threshold, L0 and L1 motion vectors are updated. In some embodiments, if a cost or error after a two-direction-DMVR process is greater than or equal to a threshold, L0 and L1 motion vectors are not updated. L0 and L1 motion vectors may not be updated (e.g., the BDMVR refined motion vectors are not used for the following motion compensation), if the cost after a two-direction-DMVR process is greater than or equal to a threshold.

In some embodiments, if at least one of: distortion, cost or error of a one-direction-DMVR is less than a threshold, L0 motion vector or L1 motion vector is updated. For example, if the distortion/cost/error of a one-direction-DMVR process is less than a threshold, L0 or L1 (depending on which direction of motion vector is supposed to be updated during the one-direction-DMVR process) motion vector may be updated.

In some embodiments, if at least one of: distortion, cost or error of a one-direction-DMVR is greater than or equal to a threshold, at least one of: L0 motion vector or L1 motion vector is not updated. For example, L0 and/or L1 motion vectors may not be updated (e.g., the BDMVR refined motion vectors are not used for the following motion compensation), if the cost of one-direction-DMVR is greater than or equal to a threshold.

In some embodiments, whether to apply the DMVR process to the target block is dependent on a function with prediction samples from L0 and L1 as input. In some embodiments, whether to apply the DMVR process to the target block is dependent on at least one of: a distortion, cost, or error by comparing L1 prediction and L1 prediction of the target block. In one example, whether to apply a DMVR process to a video unit, may be dependent on the distortion/cost/error by comparing L0 prediction and L1 prediction (which are identified by motion vectors before the DMVR process) of the current video unit.

In some embodiments, the DMVR process comprises both PU or CU level DMVR and subblock level DMVR. In some embodiments, the DMVR process comprises one of: PU or CU level DMVR or subblock level DMVR.

In some embodiments, if a cost or error is less than a threshold, the DMVR process is not applied to the target block. In some embodiments, the threshold is dependent on a block dimension of the target block. In some embodiments, the target block is coded with at least one of: a MERGE based coding method, or an AMVP based coding method.

In some embodiments, whether to perform a second level DMVR process is dependent on a result of a first level DMVR process. In some embodiments, the first level DMVR process comprises a PU or CU level DMVR process. In some embodiments, the second level DMVR process comprises a subblock level DMVR process. In one example, whether to perform a second level (e.g., K×K subblock level) DMVR process may be dependent on the results of the first level (e.g., PU/CU level) DMVR process.

In some embodiments, whether to perform a second level DMVR process to the target block is based on a cost or effort after the first level DMVR process of the target block. In some embodiments, whether to perform a second level DMVR process to the target block is dependent based on whether L0 motion vector and/or L1 motion vector is updated after the first level DMVR process of the target block.

In some embodiments, whether to perform a second level DMVR process to the target block is dependent on a MV difference of a current PU and a neighboring PU or CU of the current PU. In some embodiments, if the MV difference is larger than a predefined threshold, the second level DMVR is applied. For example, if the MV difference is bigger than a predefined threshold, such as a half pixel, then the second level DMVR is applied.

In some embodiments, the first level DMVR process is a two-direction-DMVR which refines both L0 and L1 motion vectors. In some embodiments, the first level DMVR process is a one-direction-DMVR which refines either L0 motion vector or L1 motion vector.

In some embodiments, an indication of whether to and/or how to determine at least one of: whether to use a refined MV provided by a DMVR or whether to update a L0 and/or L1 motion vector after the DMVR process, based on a result of the DMVR process is indicated at one of the followings: a sequence level, a group of pictures level, a picture level, a slice level, or a tile group level.

In some embodiments, an indication of whether to and/or how to determine at least one of: whether to use a refined MV provided by a DMVR or whether to update a L0 and/or L1 motion vector after the DMVR process, based on a result of the DMVR process is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to determine at least one of: whether to use a refined MV provided by a DMVR or whether to update a L0 and/or L1 motion vector after the DMVR process, based on a result of the DMVR process is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to determine at least one of: whether to use a refined MV provided by a DMVR or whether to update a L0 and/or L1 motion vector after the DMVR process based on a result of the DMVR process may be determined based on coded information of the target block. The coded information includes at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method may comprise: determining at least one of the followings for a target block of the video: whether to use a refined motion vector (MV) provided by a decoder side motion vector refinement (DMVR) or whether to update a L0 and/or L1 motion vector after the DMVR process, based on a result of the DMVR process; and generating a bitstream of the target block based on the determining.

In some embodiments, a method for storing bitstream of a video, comprises: determining at least one of the followings for a target block of the video: whether to use a refined motion vector (MV) provided by a decoder side motion vector refinement (DMVR) or whether to update a L0 and/or L1 motion vector after the DMVR process, based on a result of the DMVR process; generating a bitstream of the target block based on the determining; and storing the bitstream in a non-transitory computer-readable recording medium.

Figure 34:
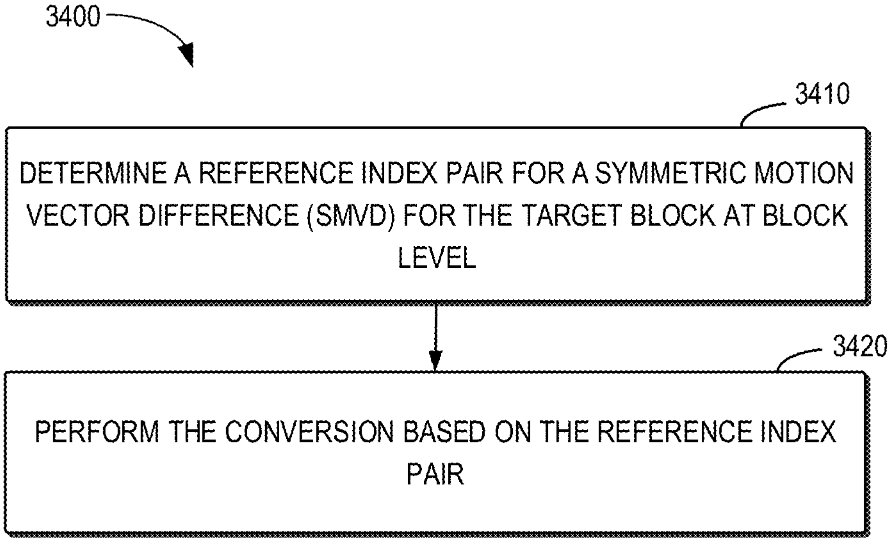
FIG. 34 illustrates a flow chart of a method according to embodiments of the present disclosure.

FIG. 34 illustrates a flowchart of a method 3400 for video processing in accordance with some embodiments of the present disclosure. The method 3400 may be implemented during a conversion between a video unit and a bitstream of the video unit.

As shown in FIG. 34, at block 3410, during a conversion between a target block of a video and a bitstream of the target block, a reference index pair for a symmetric motion vector difference (SMVD) for the target block is determined at block level. In one example, a best reference index pair (i.e., L0-refIdx and L1-refIdx) for SMVD may be decided at block level other than slice level.

At block 3420, the conversion is performed based on the reference index pair. In some embodiments, the conversion may comprise ending the target block into the bitstream. Alternatively, the conversion may comprise decoding the target block from the bitstream. Compared with the conventional solution, some embodiments of the present disclosure can advantageously improve the coding efficiency, coding gain, coding performance, and flexibility.

In some embodiments, a best reference index pair for SMVD may be determined at block level other than slice level. In some embodiments, the reference index pair for SMVD is not determined by a picture order count distance. For example, the reference index pair used for SMVD mode may NOT be decided by the POC distance (e.g., curPoc-refL0Poc and curPoc-refL1Poc).

In some embodiments, the reference index pair for SMVD is not determined at slice level. In some embodiments, the reference index pair of SMVD is determined at block level.

In some embodiments, a list of reference index pairs is generated from all available reference pictures, and which reference index pair is used for the target block that is a SMVD coded block is derived based on a decoder side motion vector refinement (DMVR) cost. In one example, a list of reference index pairs may be generated from all available reference pictures, and which reference index pair is used for the SMVD coded video unit may be derived based on DMVR cost.

In some embodiments, a motion vector predictor (MVP) candidate is used to identify a bilateral matching block in both L0 reference and L1 reference blocks, and the DMVR cost is conducted by comparing at least one of: difference, error, or cost between the L0 and L1 reference blocks. In some embodiments, the MVP candidate of the L0 and L1 reference blocks is indicated in the bitstream.

In some embodiments, the MVP candidate of the L0 and L1 reference blocks is selected by a decoder side motion vector derivation (DMVD) method (such as, DMVR and/or TM). In some embodiments, the MVP candidate of the L0 and L1 reference blocks is refined by a DMVD method (such as, DMVR and/or TM).

In some embodiments, if the target block is a SMVD coded block, which reference index pair is used for the target block is indicated in the bitstream. In some embodiments, the reference index pair is indicated under a condition. In some embodiments, the condition is that only when DMVR or TM matching cost of a first pair of reference pictures is not a best one compared with other pairs. The reference index pair may be signalled under some conditions. For example, only when DMVR/TM matching cost of the first pair of reference pictures is not the best one compared with other pairs.

In some embodiments, an indication of whether to and/or how to determine a reference index pair for a SMVD for the target block at block level is indicated at one of the followings: a sequence level, a group of pictures level, a picture level, a slice level, or a tile group level.

In some embodiments, an indication of whether to and/or how to determine a reference index pair for a SMVD for the target block at block level is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to determine a reference index pair for a SMVD for the target block at block level is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to determine a reference index pair for a SMVD for the target block at block level may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method comprises: determining a reference index pair for a symmetric motion vector difference (SMVD) for a target block of the video at block level; and generating a bitstream of the target block based on the reference index pair.

In some embodiments, a method for storing bitstream of a video, comprises: determining a reference index pair for a symmetric motion vector difference (SMVD) for a target block of the video at block level; generating a bitstream of the target block based on the reference index pair; and storing the bitstream in a non-transitory computer-readable recording medium.

Implementations of the present disclosure can be described in view of the following clauses, the features of which can be combined in any reasonable manner.

Clause 1. A method of video processing, comprising: refining, during a conversion between a target block of a video and a bitstream of the target block, a bi-motion vector predictor (MVP) of the target block by applying a decoder side motion vector derivation process, and wherein the target block is coded with an advanced motion vector prediction (AMVP) mode; and performing the conversion based on the refined bi-MVP.

Clause 2. The method of clause 1, wherein the bi-MVP of the target block is refined before a motion vector difference is added.

Clause 3. The method of clause 1, wherein the decoder side motion vector derivation process comprises at least one of: a template matching (TM) process, or a decoder side motion vector refinement (DMVR) process.

Clause 4. The method of clause 1, wherein the AMVP mode comprises at least one of: an AMVP-MERGE mode, a regular AMVP mode, an affine-AMVP mode, or a symmetric motion vector difference (SMVD) mode.

Clause 5. The method of clause 1, wherein if the bi-MVP does not satisfy a DMVR condition, a TM motion vector refinement is applied to each side of the bi-MVP respectively to refine the bi-MVP.

Clause 6. The method of clause 5, wherein if the bi-MVP is from two difference directions with different picture order count (POC) distances, the DMVR condition is not satisfied.

Clause 7. The method of clause 1, wherein if the bi-MVP satisfies a DMVR condition, a DMVR motion vector refinement is applied to the bi-MVP.

Clause 8. The method of clause 7, wherein if the bi-MVP is from two difference directions with equal picture order count (POC) distance, the DMVR condition is satisfied.

Clause 9. The method of clause 1, wherein a MVP refinement process is indicated at different levels.

Clause 10. The method of clause 9, wherein the different levels comprise at least one of: a sequence parameter set (SPS), a picture parameter set (PPS), a slice, a coding tree unit (CTI), a coding unit (CU), or a prediction unit (PU).

Clause 11. The method of clause 1, wherein a MVP refinement process is referred to at prediction unit (PU) level depending on whether a DMVR condition is satisfied.

Clause 12. The method of clause 11, wherein if the DMVR condition is satisfied, a DMVR is used to refine the bi-MVP, and wherein if the DMVR condition is not satisfied, a TM is used to refine the bi-MVP.

Clause 13. The method of clause 1, wherein a bi-MVP candidate for the target block is selected based on a DMVR cost.

Clause 14. the method of clause 13, wherein the target block is coded with at least one of: a regular AMVP mode, an affine-AMVP mode, a SMVD mode, or an AMVP-MERGE mode.

Clause 15. The method of clause 13, wherein a plurality of bi-MVP candidates are constructed from available L0 MVP candidates and L1 MVP candidates.

Clause 16. The method of clause 15, wherein refined L0 and L1 MVPs with one directional DMVR are selected for the plurality of bi-MVP candidates.

Clause 17. The method of clause 13, wherein which bi-MVP candidate is used for the target block is based on a DMVR cost.

Clause 18. The method of clause 13, wherein which bi-MVP candidate is used for the target block is indicated in the bitstream.

Clause 19. The method of clause 1, wherein a motion vector of the target block is refined by a DMVR process or a TM process.

Clause 20. The method of clause 19, wherein the target block is coded with at least one of: a regular AMVP mode, a SMVD mode, or an AMVP-MERGE mode.

Clause 21. The method of clause 19, wherein the DMVR process comprises at least one of: a subblock level DMVR process, a PU level DMVR process, or a PU level DMVR process followed by a subblock level DMVR process.

Clause 22. The method of clause 19, wherein if a DMVR condition is not satisfied, the TM process is applied to refine the motion vector.

Clause 23. The method of clause 19, wherein a refinement method of the motion vector is indicated at difference levels.

Clause 24. The method of clause 1, wherein a rule of bi-MVP candidate list generation is different from a rule of uni-MVP candidate list generation.

Clause 25. The method of clause 24, wherein a bi-MVP candidate list is generated for an AMVP mode wherein a bi-MVP candidate does not directly combine elements from a uni-predicted AMVP list.

Clause 26. The method of clause 24, wherein if the target bloc is coded with an AMVP mode, a first rule is used for a construction of a L0-MVP candidate list or L1-MVP candidate list, while a second rule is used for a bi-MVP candidate list construction.

Clause 27. The method of clause 26, wherein uni-prediction MVP candidates are refined by a TM related process, and the refined uni-prediction MVP candidates are inserted to the L0-MVP candidate list or the L1-MVP candidate list.

Clause 28. The method of clause 26, wherein bi-prediction MVP candidates are refined by at least one of: a bilateral matching (BM) related process or a TM related process, and the refined bi-prediction MVP candidates are inserted to the bi-MVP candidate list.

Clause 29. The method of clause 24, wherein if the target bloc is coded with an AMVP mode, a first rule is used to select a best MVP for L0 or L1 prediction, while a second rule is used to select a best bi-MVP candidate for bi-prediction.

Clause 30. The method of clause 29, wherein a TM based cost evaluation process is used to select a best MVP for L0 and L1 prediction.

Clause 31. The method of clause 29, wherein at least one of: a BM based cost evaluation or a TM based cost evaluation is used to select a best bi-MVP for bi-prediction.

Clause 32. The method of clause 1, wherein an indicated MVP for bi-prediction PU is different from uni-prediction PU.

Clause 33. The method of clause 32, wherein a bi-prediction MVP for two predictions are jointly derived, or wherein the bi-prediction MV predictor for two predictions are jointly represented, or wherein the bi-prediction MV predictor for two predictions are jointly coded.

Clause 34. The method of clause 33, wherein a selected MVP index in a bi-prediction MVP candidate list is coded directly.

Clause 35. The method of clause 33, wherein a selected MVP index in a bi-prediction MVP candidate list is not explicitly coded but implicitly derived based on a decoder side derivation based method.

Clause 36. The method of clause 32, wherein a bi-prediction MVP candidate list is reordered by DMVR or TM cost for the bi-prediction with each bi-prediction MVP candidate.

Clause 37. The method of clause 1, wherein a rule of MVP candidate generation depends on a coding method of the target block.

Clause 38. The method of clause 37, wherein a rule of bi-MVP candidate list generation for SMVD mode is based on DMVR, while a rule of bi-MVP candidate list generation for regular AMVP mode is not based on DMVR.

Clause 39. The method of clause 37, wherein a best MVP candidate is selected for SMVD mode, and wherein the selection of the best MVP candidate is different from a MVP candidate selection for other coding modes.

Clause 40. The method of clause 39, wherein a best MVP for regular AMVP is selected for L0 and L1 respectively based on TM cost, and wherein a best MVP for SMVD is reselected from all available L0 and L1 MVP candidates following a new rule.

Clause 41. The method of clause 1, wherein if the bi-MVP is applied, signaling of MVP index for each list is skipped.

Clause 42. The method of clause 1, wherein a first syntax element is indicated to indicate whether bi-MVP is used for the target block that is coded with an AMVP mode.

Clause 43. The method of clause 42, wherein the AMVP mode is at least one of: a regular AMVP mode, an affine-AMVP mode, a SMVD mode, or an AMVP-MERGE mode.

Clause 44. The method of clause 42, wherein a bi-MVP is generated by DMVR.

Clause 45. The method of clause 42, wherein a plurality of bi-MVPs are used.

Clause 46. The method of clause 42, wherein a second syntax element is indicated to indicate a selected bi-MVP, if bi-MVP is used.

Clause 47. The method of clause 42, wherein if bi-MVP is used, singling of MVP index for each list is skipped.

Clause 48. The method of clause 1, wherein whether to and/or how to apply bi-MVP depends on information which is indicated or derived in one of the followings: a sequence level, a picture level, a slice level, or a CU level.

Clause 49. The method of clause 48, wherein if all reference pictures are from a same direction, the bi-MVP is not applied.

Clause 50. The method of clause 48, wherein if MVD-1 is not indicated, the bi-MVP is not applied.

Clause 51. The method of any of clauses 1-50, wherein an indication of whether to and/or how to refine the bi-MVP of the target block by applying the decoder side motion vector derivation process is indicated at one of the followings: sequence level, group of pictures level, picture level, slice level, or tile group level.

Clause 52. The method of any of clauses 1-50, wherein an indication of whether to and/or how to refine the bi-MVP of the target block by applying the decoder side motion vector derivation process is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 53. The method of any of clauses 1-50, wherein an indication of whether to and/or how to refine the bi-MVP of the target block by applying the decoder side motion vector derivation process is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 54. The method of any of clauses 1-50, further comprising: determining, based on coded information of the target block, whether to and/or how to refine the bi-MVP of the target block by applying the decoder side motion vector derivation process, the coded information including at least one of: a block size, a colour format, a single and/or dual tree partitioning, a colour component, a slice type, or a picture type.

Clause 55. A method of video processing, comprising: applying, during a conversion between a target block of a video and a bitstream of the target block, a decoder side motion vector refinement (DMVR) process to the target block, wherein the DMVR process comprises one or more stages of motion vector refinements; and performing the conversion based on the DMVR process.

Clause 56. The method of clause 55, wherein the DMVR process only comprises a single state motion vector refinement.

Clause 57. The method of clause 55, wherein the number of states of the motion vector refinements for the DMVR process depends on available coding information.

Clause 58. The method of clause 55, wherein a granularity of the DMVR process for the target block depends on available coding information.

Clause 59. The method clause 55, wherein if the target block is coded with a target coding mode, only prediction unit (PU) level DMVR is applied for the target block.

Clause 60. The method clause 55, wherein if the target block is coded with a target coding mode, only coding unit (CU) level DMVR is applied for the target block.

Clause 61. The method of clause 55, wherein if the target block is an advanced motion vector prediction (AMVP) coded block, a PU or CU level DMVR motion refinement is allowed to refine motion vector predictors of the target block, or wherein subblock level DMVR motion refinement is not used to refine the motion vector predictors of the target block.

Clause 62. The method of clause 55, wherein whether to apply a single DMVR process or multi-stage DMVR process depends on a coding method associated with the target block.

Clause 63. The method of clause 55, wherein if the target block is coded with a target coding mode, only a target subblock level DMVR is applied for the target block.

Clause 64. The method of clause 55, wherein if the target block is an AMVP coded block, a subblock level DMVR motion refinement is allowed to refine motion vectors reconstructed from adding a motion vector difference to a motion vector predictor, and wherein a PU or CU level DMVR motion refinement is not used to refine the reconstructed motion vectors.

Clause 65. The method of clause 55, wherein if the target block is coded with a target coding mode, only M*N subblock based DMVR is applied for the target block, and wherein M and N are integer numbers.

Clause 66. The method of clause 65, wherein M and N are equal to 16, or wherein M and N are equal to 8, or wherein M and N are equal to 4.

Clause 67. The method of clause 56, wherein the DMVR process comprises a multiple stages motion vector refinement.

Clause 68. The method of clause 67, wherein a PU or CU based DMVR and at least one subblock based DMVR are cascaded for motion vector refinement.

Clause 69. The method of clause 67, wherein a first number of stages DMVR based motion refinement is applied, and wherein each stage comprises its own granularity.

Clause 70. The method of clause 69, wherein if the first number is 3, the PU or CU based DMVR is applied first, followed by a K*K subblock based DMVR, and further cascaded with an L*L subblock based DMVR, to get a final refined motion field, and wherein K and L are integer numbers.

Clause 71. The method of clause 69, wherein if the first number is 2, the PU or CU based DMVR is applied first, and cascaded with a K*K subblock based DMVR, to get a final refined motion field, and wherein K is an integer number.

Clause 72. The method of any of clauses 55-71, wherein an indication of whether to and/or how to apply the DMVR process that comprises one or more stages of motion vector refinements to the target block is indicated at one of the followings: a sequence level, a group of pictures level, a picture level, a slice level, or a tile group level.

Clause 73. The method of any of clauses 55-71, wherein an indication of whether to and/or how to apply the DMVR process that comprises one or more stages of motion vector refinements to the target block is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 74. The method of any of clauses 55-71, wherein an indication of whether to and/or how to apply the DMVR process that comprises one or more stages of motion vector refinements to the target block is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 75. The method of any of clauses 55-71, further comprising: determining, based on coded information of the target block, whether to and/or how to apply the DMVR process that comprises one or more stages of motion vector refinements to the target block, the coded information including at least one of: a block size, a colour format, a single and/or dual tree partitioning, a colour component, a slice type, or a picture type.

Clause 76. A method of video processing, comprising: determining, during a conversion between a target block of a video and a bitstream of the target block, at least one of the followings for the target block: whether to use a refined motion vector (MV) provided by a decoder side motion vector refinement (DMVR) or whether to update a L0 and/or L1 motion vector after the DMVR process, based on a result of the DMVR process; and performing the conversion based on the determining.

Clause 77. The method of clause 76, wherein the DMVR process is at least one of: a PU or CU level DMVR process, or a subblock level DMVR.

Clause 78. The method of clause 76, wherein if a cost or error after a two-direction-DMVR process is less than a threshold, L0 and L1 motion vectors are updated.

Clause 79. The method of clause 76, wherein if a cost or error after a two-direction-DMVR process is greater than or equal to a threshold, L0 and L1 motion vectors are not updated.

Clause 80. The method of clause 76, wherein if at least one of: distortion, cost or error of a one-direction-DMVR is less than a threshold, L0 motion vector or L1 motion vector is updated.

Clause 81. The method of clause 76, wherein if at least one of: distortion, cost or error of a one-direction-DMVR is greater than or equal to a threshold, at least one of: L0 motion vector or L1 motion vector is not updated.

Clause 82. Th method of clause 76, wherein whether to apply the DMVR process to the target block is dependent on a function with prediction samples from L0 and L1 as input.

Clause 83. The method of clause 82, wherein whether to apply the DMVR process to the target block is dependent on at least one of: a distortion, cost, or error by comparing L1 prediction and L1 prediction of the target block.

Clause 84. The method of clause 82, wherein the DMVR process comprises both PU or CU level DMVR and sub-block level DMVR, and wherein the DMVR process comprises one of: PU or CU level DMVR or subblock level DMVR.

Clause 85. The method of clause 82, wherein if a cost or error is less than a threshold, the DMVR process is not applied to the target block.

Clause 86. The method of clause 85, wherein the threshold is dependent on a block dimension of the target block.

Clause 87. The method of clause 85, wherein the target block is coded with at least one of: a MERGE based coding method, or an AMVP based coding method.

Clause 88. The method of clause 76, wherein whether to perform a second level DMVR process is dependent on a result of a first level DMVR process.

Clause 89. The method of clause 88, wherein the first level DMVR process comprises a PU or CU level DMVR process, or wherein the second level DMVR process comprises a subblock level DMVR process.

Clause 90. The method of clause 76, wherein whether to perform a second level DMVR process to the target block is based on a cost or effort after the first level DMVR process of the target block.

Clause 91. The method of clause 76, wherein whether to perform a second level DMVR process to the target block is dependent based on whether L0 motion vector and/or L1 motion vector is updated after the first level DMVR process of the target block.

Clause 92. The method of clause 76, wherein whether to perform a second level DMVR process to the target block is dependent on a MV difference of a current PU and a neighboring PU or CU of the current PU.

Clause 93. The method of clause 92, wherein if the MV difference is larger than a predefined threshold, the second level DMVR is applied.

Clause 94. The method of any of clauses 88-93, wherein the first level DMVR process is a two-direction-DMVR which refines both L0 and L1 motion vectors, or wherein the first level DMVR process is a one-direction-DMVR which refines either L0 motion vector or L1 motion vector.

Clause 95. The method of any of clauses 76-94, wherein an indication of whether to and/or how to determine at least one of: whether to use a refined MV provided by a DMVR or whether to update a L0 and/or L1 motion vector after the DMVR process, based on a result of the DMVR process is indicated at one of the followings: a sequence level, a group of pictures level, a picture level, a slice level, or a tile group level.

Clause 96. The method of any of clauses 76-94, wherein an indication of whether to and/or how to determine at least one of: whether to use a refined MV provided by a DMVR or whether to update a L0 and/or L1 motion vector after the DMVR process, based on a result of the DMVR process is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 97. The method of any of clauses 76-94, wherein an indication of whether to and/or how to determine at least one of: whether to use a refined MV provided by a DMVR or whether to update a L0 and/or L1 motion vector after the DMVR process, based on a result of the DMVR process is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 98. The method of any of clauses 76-94, further comprising: determining, based on coded information of the target block, whether to and/or how to determine at least one of: whether to use a refined MV provided by a DMVR or whether to update a L0 and/or L1 motion vector after the DMVR process, based on a result of the DMVR process, the coded information including at least one of: a block size, a colour format, a single and/or dual tree partitioning, a colour component, a slice type, or a picture type.

Clause 99. A method of video processing, comprising: determining, during a conversion between a target block of a video and a bitstream of the target block, a reference index pair for a symmetric motion vector difference (SMVD) for the target block at block level; and performing the conversion based on the reference index pair.

Clause 100. The method of clause 99, wherein a best reference index pair for SMVD is determined at block level other than slice level.

Clause 101. The method of clause 99, wherein the reference index pair for SMVD is not determined by a picture order count distance.

Clause 102. The method of clause 99, wherein the reference index pair for SMVD is not determined at slice level.

Clause 103. The method of clause 99, wherein the reference index pair of SMVD is determined at block level.

Clause 104. The method of clause 99, wherein a list of reference index pairs is generated from all available reference pictures, and wherein which reference index pair is used for the target block that is a SMVD coded block is derived based on a decoder side motion vector refinement (DMVR) cost.

Clause 105. The method of clause 104, wherein a motion vector predictor (MVP) candidate is used to identify a bilateral matching block in both L0 reference and L1 reference blocks, and wherein the DMVR cost is conducted by comparing at least one of: difference, error, or cost between the L0 and L1 reference blocks.

Clause 106. The method of clause 105, wherein the MVP candidate of the L0 and L1 reference blocks is indicated in the bitstream.

Clause 107. The method of clause 105, wherein the MVP candidate of the L0 and L1 reference blocks is selected by a decoder side motion vector derivation (DMVD) method.

Clause 108. The method of clause 105, wherein the MVP candidate of the L0 and L1 reference blocks is refined by a DMVD method.

Clause 109. The method of clause 99, wherein if the target block is a SMVD coded block, which reference index pair is used for the target block is indicated in the bitstream.

Clause 110. The method of clause 109, wherein the reference index pair is indicated under a condition.

Clause 111. The method of clause 110, wherein the condition is that only when DMVR or TM matching cost of a first pair of reference pictures is not a best one compared with other pairs.

Clause 112. The method of any of clauses 99-111, wherein an indication of whether to and/or how to determine a reference index pair for a SMVD for the target block at block level is indicated at one of the followings: a sequence level, a group of pictures level, a picture level, a slice level, or a tile group level.

Clause 113. The method of any of clauses 99-111, wherein an indication of whether to and/or how to determine a reference index pair for a SMVD for the target block at block level is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 114. The method of any of clauses 99-111, wherein an indication of whether to and/or how to determine a reference index pair for a SMVD for the target block at block level is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 115. The method of any of clauses 99-111, further comprising: determining, based on coded information of the target block, whether to and/or how to determine a reference index pair for a SMVD for the target block at block level, the coded information including at least one of: a block size, a colour format, a single and/or dual tree partitioning, a colour component, a slice type, or a picture type.

Clause 116. The method of any of clauses 1-115, wherein the conversion includes encoding the target block into the bitstream.

Clause 117. The method of any of clauses 1-115, wherein the conversion includes decoding the target block from the bitstream.

Clause 118. An apparatus for processing video data comprising a processor and a non-transitory memory with instructions thereon, wherein the instructions upon execution by the processor, cause the processor to perform a method in accordance with any of clauses 1-117.

Clause 119. A non-transitory computer-readable storage medium storing instructions that cause a processor to perform a method in accordance with any of clauses 1-117.

Clause 120. A non-transitory computer-readable recording medium storing a bitstream of a video which is generated by a method performed by a video processing apparatus, wherein the method comprises: refining a bi-motion vector predictor (MVP) of a target block of the video by applying a decoder side motion vector derivation process, and wherein the target block is coded with an advanced motion vector prediction (AMVP) mode; and generating a bitstream of the target block based on the refined bi-MVP.

Clause 121. A method for storing bitstream of a video, comprising: refining a bi-motion vector predictor (MVP) of a target block of the video by applying a decoder side motion vector derivation process, and wherein the target block is coded with an advanced motion vector prediction (AMVP) mode; generating a bitstream of the target block based on the refined bi-MVP; and storing the bitstream in a non-transitory computer-readable recording medium.

Clause 122. A non-transitory computer-readable recording medium storing a bitstream of a video which is generated by a method performed by a video processing apparatus, wherein the method comprises: applying a decoder side motion vector refinement (DMVR) process to a target block of the video, wherein the DMVR process comprises one or more stages of motion vector refinements; and generating a bitstream of the target block based on the DMVR process.

Clause 123. A method for storing bitstream of a video, comprising: applying a decoder side motion vector refinement (DMVR) process to a target block of the video, wherein the DMVR process comprises one or more stages of motion vector refinements; generating a bitstream of the target block based on the DMVR process; and storing the bitstream in a non-transitory computer-readable recording medium.

Clause 124. A non-transitory computer-readable recording medium storing a bitstream of a video which is generated by a method performed by a video processing apparatus, wherein the method comprises: determining at least one of the followings for a target block of the video: whether to use a refined motion vector (MV) provided by a decoder side motion vector refinement (DMVR) or whether to update a L0 and/or L1 motion vector after the DMVR process, based on a result of the DMVR process; and generating a bitstream of the target block based on the determining.

Clause 125. A method for storing bitstream of a video, comprising: determining at least one of the followings for a target block of the video: whether to use a refined motion vector (MV) provided by a decoder side motion vector refinement (DMVR) or whether to update a L0 and/or L1 motion vector after the DMVR process, based on a result of the DMVR process; generating a bitstream of the target block based on the determining; and storing the bitstream in a non-transitory computer-readable recording medium.

Clause 126. A non-transitory computer-readable recording medium storing a bitstream of a video which is generated by a method performed by a video processing apparatus, wherein the method comprises: determining a reference index pair for a symmetric motion vector difference (SMVD) for a target block of the video at block level; and generating a bitstream of the target block based on the reference index pair.

Clause 127. A method for storing bitstream of a video, comprising: determining a reference index pair for a symmetric motion vector difference (SMVD) for a target block of the video at block level; generating a bitstream of the target block based on the reference index pair; and storing the bitstream in a non-transitory computer-readable recording medium.

Example Device

Figure 35:
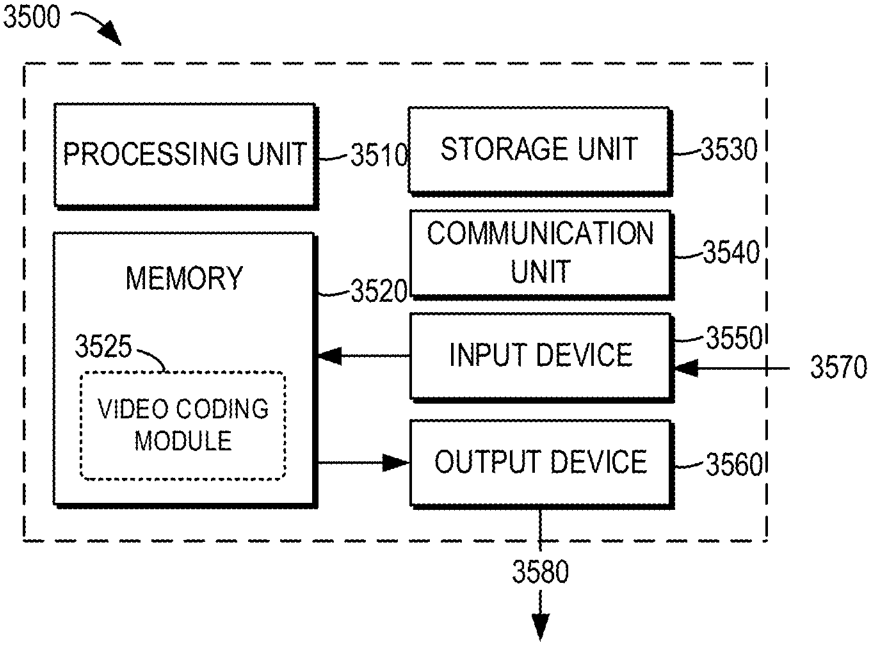
FIG. 35 illustrates a block diagram of a computing device in which various embodiments of the present disclosure can be implemented.

FIG. 35 illustrates a block diagram of a computing device 3500 in which various embodiments of the present disclosure can be implemented. The computing device 3500 may be implemented as or included in the source device 110 (or the video encoder 114 or 200) or the destination device 120 (or the video decoder 124 or 300).

It would be appreciated that the computing device 3500 shown in FIG. 35 is merely for purpose of illustration, without suggesting any limitation to the functions and scopes of the embodiments of the present disclosure in any manner.

As shown in FIG. 35, the computing device 3500 includes a general-purpose computing device 3500. The computing device 3500 may at least comprise one or more processors or processing units 3510, a memory 3520, a storage unit 3530, one or more communication units 3540, one or more input devices 3550, and one or more output devices 3560.

In some embodiments, the computing device 3500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 3500 can support any type of interface to a user (such as "wearable" circuitry and the like).

The processing unit 3510 may be a physical or virtual processor and can implement various processes based on programs stored in the memory 3520. In a multi-processor system, multiple processing units execute computer executable instructions in parallel so as to improve the parallel processing capability of the computing device 3500. The processing unit 3510 may also be referred to as a central processing unit (CPU), a microprocessor, a controller or a microcontroller.

The computing device 3500 typically includes various computer storage medium. Such medium can be any medium accessible by the computing device 3500, including, but not limited to, volatile and non-volatile medium, or detachable and non-detachable medium. The memory 3520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 3530 may be any detachable or non-detachable medium and may include a machine-readable medium such as a memory, flash memory drive, magnetic disk or another other media, which can be used for storing information and/or data and can be accessed in the computing device 3500.

The computing device 3500 may further include additional detachable/non-detachable, volatile/non-volatile memory medium. Although not shown in FIG. 35, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 3540 communicates with a further computing device via the communication medium. In addition, the functions of the components in the computing device 3500 can be implemented by a single computing cluster or multiple computing machines that can communicate via communication connections. Therefore, the computing device 3500 can operate in a networked environment using a logical connection with one or more other servers, networked personal computers (PCs) or further general network nodes.

The input device 3550 may be one or more of a variety of input devices, such as a mouse, keyboard, tracking ball, voice-input device, and the like. The output device 3560 may be one or more of a variety of output devices, such as a display, loudspeaker, printer, and the like. By means of the communication unit 3540, the computing device 3500 can further communicate with one or more external devices (not shown) such as the storage devices and display device, with one or more devices enabling the user to interact with the computing device 3500, or any devices (such as a network card, a modem and the like) enabling the computing device 3500 to communicate with one or more other computing devices, if required. Such communication can be performed via input/output (I/O) interfaces (not shown).

In some embodiments, instead of being integrated in a single device, some or all components of the computing device 3500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 3500 may be used to implement video encoding/decoding in embodiments of the present disclosure. The memory 3520 may include one or more video coding modules 3525 having one or more program instructions. These modules are accessible and executable by the processing unit 3510 to perform the functionalities of the various embodiments described herein.

In the example embodiments of performing video encoding, the input device 3550 may receive video data as an input 3570 to be encoded. The video data may be processed, for example, by the video coding module 3525, to generate an encoded bitstream. The encoded bitstream may be provided via the output device 3560 as an output 3580.

In the example embodiments of performing video decoding, the input device 3550 may receive an encoded bitstream as the input 3570. The encoded bitstream may be processed, for example, by the video coding module 3525, to generate decoded video data. The decoded video data may be provided via the output device 3560 as the output 3580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method of video processing, comprising:

refining, during a conversion between a target block of a video and a bitstream of the video, a bi-motion vector predictor (MVP) of the target block by applying a decoder side motion vector derivation process before a motion vector difference is added, and wherein the target block is coded with an advanced motion vector prediction (AMVP) mode; and performing the conversion based on the refined bi-MVP.

2. The method of claim 1, wherein the decoder side motion vector derivation process comprises at least one of: a template matching (TM) process, or a decoder side motion vector refinement (DMVR) process, and/or wherein the AMVP mode comprises at least one of:

an AMVP-MERGE mode, a regular AMVP mode, an affine-AMVP mode, or a symmetric motion vector difference (SMVD) mode.

3. The method of claim 1, wherein if the bi-MVP does not satisfy a DMVR condition, a TM motion vector refinement is applied to each side of the bi-MVP respectively to refine the bi-MVP, and/or wherein if the bi-MVP satisfies a DMVR condition, a DMVR motion vector refinement is applied to the bi-MVP.

4. The method of claim 3, wherein if the bi-MVP is from two different directions with different picture order count (POC) distances, the DMVR condition is not satisfied; and/or wherein if the bi-MVP is from two difference directions with equal picture order count (POC) distance, the DMVR condition is satisfied.

5. The method of claim 1, wherein a decoder side motion vector refinement (DMVR) process to is applied to the target block, wherein the DMVR process comprises one or more stages of motion vector refinements.

6. The method of claim 5, wherein the DMVR process only comprises a single state motion vector refinement.

7. The method of claim 5, wherein the number of states of the motion vector refinements for the DMVR process depends on available coding information.

8. The method of claim 5, wherein a granularity of the DMVR process for the target block depends on available coding information.

9. The method of claim 5, wherein if the target block is coded with a target coding mode, only prediction unit (PU) level DMVR is applied for the target block.

10. The method of claim 5, wherein if the target block is coded with a target coding mode, only coding unit (CU) level DMVR is applied for the target block.

11. The method of claim 5, wherein if the target block is an advanced motion vector prediction (AMVP) coded block, a PU or CU level DMVR motion refinement is allowed to refine motion vector predictors of the target block, or wherein subblock level DMVR motion refinement is not used to refine the motion vector predictors of the target block.

12. The method of claim 5, wherein whether to apply a single DMVR process or multi-stage DMVR process depends on a coding method associated with the target block.

13. The method of claim 1, wherein at least one of the followings for the target block: whether to use a refined motion vector (MV) provided by a decoder side motion vector refinement (DMVR) or whether to update a L0 and/or L1 motion vector after the DMVR process is determined based on a result of the DMVR process.

14. The method of claim 13, wherein the DMVR process is at least one of:

a PU or CU level DMVR process, or a subblock level DMVR.

15. The method of claim 13, wherein if a cost or error after a two-direction-DMVR process is less than a threshold, L0 and L1 motion vectors are updated, and/or wherein if a cost or error after a two-direction-DMVR process is greater than or equal to a threshold, L0 and L1 motion vectors are not updated.

16. The method of claim 1, wherein the conversion includes encoding the target block into the bitstream, or wherein the conversion includes decoding the target block from the bitstream.

17. An apparatus for processing video data comprising a processor and a non-transitory memory with instructions thereon, wherein the instructions upon execution by the processor, cause the processor to:

refine, during a conversion between a target block of a video and a bitstream of the video, a bi-motion vector predictor (MVP) of the target block by applying a decoder side motion vector derivation process before a motion vector difference is added, and wherein the target block is coded with an advanced motion vector prediction (AMVP) mode; and perform the conversion based on the refined bi-MVP.

18. A non-transitory computer-readable storage medium storing instructions that cause a processor to:

refine, during a conversion between a target block of a video and a bitstream of the video, a bi-motion vector predictor (MVP) of the target block by applying a decoder side motion vector derivation process before a motion vector difference is added, and wherein the target block is coded with an advanced motion vector prediction (AMVP) mode; and perform the conversion based on the refined bi-MVP.

19. A method for storing bitstream of a video, comprising:

refining a bi-motion vector predictor (MVP) of a target block of the video by applying a de-coder side motion vector derivation process before a motion vector difference is added, and wherein the target block is coded with an advanced motion vector prediction (AMVP) mode;

generating a bitstream of the target block based on the refined bi-MVP; and storing the bitstream in a non-transitory computer-readable recording medium.

* * * * *